(12) United States Patent
Cheah et al.

(10) Patent No.: US 8,644,418 B2
(45) Date of Patent: Feb. 4, 2014

(54) TRANSMITTER AND RECEIVER MODULES FOR UNIDIRECTIONAL COMMUNICATIONS AND A METHOD USING THE AFOREMENTIONED

(75) Inventors: Chee Sin Cheah, Singapore (SG); Cunsheng Vincent Dong, Singapore (SG)

(73) Assignee: Creative Technology Ltd, Singapore (SG)

( * ) Notice: Subject to any disclaimer, the term of this patent is extended or adjusted under 35 U.S.C. 154(b) by 252 days.

(21) Appl. No.: 12/904,866

(22) Filed: Oct. 14, 2010

(65) Prior Publication Data
US 2012/0093254 A1 Apr. 19, 2012

(51) Int. Cl.
*H04L 27/00* (2006.01)

(52) U.S. Cl.
USPC ........... 375/295; 375/219; 375/220; 375/221; 375/222; 375/227; 375/316; 375/326; 455/62; 455/63.3; 455/67.13; 455/69; 455/73; 455/91

(58) Field of Classification Search
USPC ......... 375/295, 219, 220, 221, 222, 227, 316, 375/326; 455/454, 434, 464, 63.3, 62, 455/67.13, 69, 73, 91
See application file for complete search history.

(56) References Cited

U.S. PATENT DOCUMENTS

| | | | |
|---|---|---|---|
| 4,245,348 A * | 1/1981 | Imazeki | 455/154.2 |
| 4,780,885 A * | 10/1988 | Paul et al. | 375/267 |
| 6,667,666 B2 * | 12/2003 | Uzunoglu | 331/173 |
| 7,489,899 B2 * | 2/2009 | Kobayashi et al. | 455/3.01 |
| 2008/0014934 A1 * | 1/2008 | Balasubramanian et al. | 455/434 |
| 2009/0247157 A1 * | 10/2009 | Yoon et al. | 455/434 |

* cited by examiner

*Primary Examiner* — Leon Flores
(74) *Attorney, Agent, or Firm* — Creative Technology Ltd

(57) ABSTRACT

A transmitter module for unidirectional communication with a receiver module and a method using the aforementioned. The transmitter module includes a carrier detection portion, a source processing portion coupled to the carrier detection portion and a source transmission portion coupled to the source processing portion. The source processing portion can receive and process an information signal to produce a processed information signal in a manner such that an appropriate carrier signal is modulated with the information signal. The appropriate carrier signal can be based on the detection signals communicated from the carrier detection portion. The source processing portion can further process the information signal in a manner such that the processed information signal is associable with at least one of a unique code and an indication signal. The indication signal is associable with absence of communication of the at least one communication signal in a communication medium.

20 Claims, 12 Drawing Sheets

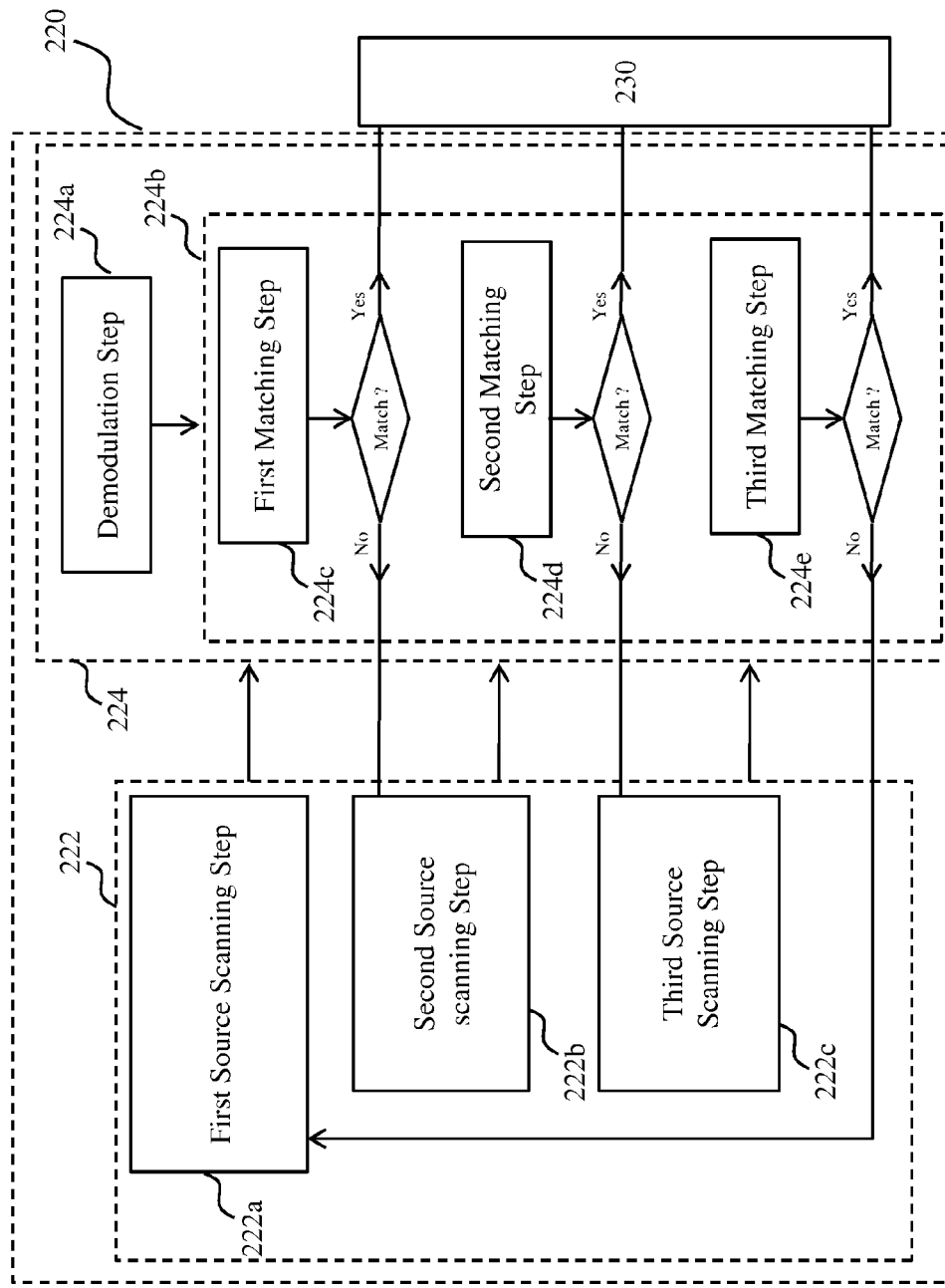

TRANSMITTER AND RECEIVER MODULES FOR UNIDIRECTIONAL COMMUNICATIONS AND A METHOD USING THE AFOREMENTIONED

FIELD OF INVENTION

The present disclosure generally relates to signal communication. More particularly, various embodiments of the disclosure relate to a system, an apparatus and a method suitable for unidirectional signal communication.

BACKGROUND

Recent trends in various areas of technology, especially in the area of consumer electronics, have indicated that wired communication based technologies are increasingly being replaced in favor of wireless communication based technologies. Such wireless communication based technologies may include wireless based communication systems or wireless based electronic gadgets/devices such as mobile phones, cordless phones, Bluetooth based devices and Wi-Fi based devices.

Thus there is an increasing reliance on wireless based signal processing for the purposes of, for example, communication of information between wireless based electronic gadgets/devices. Wireless based signal processing generally includes modulation of one or more carrier signals with information signals, thus producing modulated carrier signals. In this respect, information signals are wirelessly communicated over a communication medium by means of the modulated carrier signals. A modulated carrier signal can be associated with a carrier frequency.

The communication medium can, for example, be an aerial medium and can be generally regarded as a communication channel having a communication bandwidth via which communication signals such as the aforementioned modulated carrier signals are communicated. Thus, each communication signal communicated via the communication medium can be associated with a carrier frequency. Additionally, the communication bandwidth can be associated with a range of frequencies within which a carrier frequency can correspond.

Thus as can be appreciated, with increasing popularity and use of wireless communication based technologies, increasingly more communication signals are utilized for the purposes of, for example, wireless communication, leading to congestion in the communication bandwidth. Moreover, different wireless based electronic gadgets and/or wireless based communication systems may perform modulation using carrier signals having substantially the same carrier frequency, thus producing communication signals which may destructively interfere with each other when communicated over the communication medium. Thus integrity of the communication signals may potentially be compromised.

Various communication systems for communicating modulated carrier signals have been developed to address the foregoing problems of the use of wireless communication based technologies. Such communication systems include bidirectional communication based systems. A typical bidirectional communication based system generally includes a transmitter and a receiver. In such a bidirectional communication based system, verification signals are exchanged between the transmitter and receiver to ensure that integrity of communication signals can be preserved. Examples of verification signals include handshake signals. Further examples include a combination of transmit and receipt acknowledgement signals.

In one example, where the verification signals include a combination of transmit and receipt acknowledgement signals, verification signals can be exchanged in a manner such that after transmission of a communication signal by the transmitter, the receiver communicates a positive receipt acknowledgement signal to the transmitter in response to complete receipt of the communication signal. Where receipt of the communication signal is incomplete, for example, after a predetermined time period, the receiver communicates a null receipt acknowledgement signal to the transmitter in response. A positive acknowledgement receipt signal can signify that integrity of the communication signal has been preserved whereas a null acknowledgement receipt signal can signify that integrity of the communication signal has been compromised. Where it is determined that integrity of the communication signal has been compromised, the transmitter can be configured to resend the communication signal. Thus, the transmitter can be configured to resend the communication signal until a positive acknowledgement signal is communicated from the receiver in response.

Unfortunately, existing communication systems do not address the foregoing problems of the use of wireless communication based technologies in an efficient manner. Moreover, existing communication systems are complex in implementation.

It is therefore desirable to provide a solution to address at least one of the foregoing problems associated with conventional communication systems.

SUMMARY OF THE INVENTION

In accordance with a first aspect of the disclosure, a transmitter module for unidirectional communication with a receiver module is provided. The transmitter module includes a carrier detection portion, a source processing portion and a source transmission portion. The source processing portion is coupled to the carrier detection portion and the source transmission portion is coupled to the source processing portion.

The carrier detection portion can be configured to make an identification in a manner such that one of presence and absence of communication of at least one communication signal, within a communication medium, having a frequency component corresponding to one of at least one predetermined frequency component is identifiable. At least one preliminary identified signal can be produced based on the identification. Detection signals can be communicated from the carrier detection portion based on the at least one preliminary identified signal.

The source processing portion can be configured to receive and process an information signal to produce a processed information signal. The source processing portion can be configured to process the information signal in a manner such that an appropriate carrier signal is modulated with the information signal. The appropriate carrier signal can be based on the detection signals communicated from the carrier detection portion.

The source processing portion can be further configured to process the information signal in a manner such that the processed information signal is associable with at least one of a unique code and an indication signal. The indication signal is associable with absence of communication of the at least one communication signal in the communication medium.

The source transmission portion can be configured to receive and process the processed information signal to produce a source signal. The source signal is associable with at least one of the unique code and the indication signal. The source signal is communicable from the source transmission portion to the receiver module via the communication medium.

In accordance with a second aspect of the disclosure, a method for unidirectional communication of a transmitter module to a receiver module is provided. The transmitter module comprises a source processing portion and a carrier detection portion coupled to the source processing portion.

The method comprises determining an appropriate carrier, receiving and processing an information signal, and transmitting a source signal.

The appropriate carrier can be determined based on detection signals communicated from the carrier detection portion. The detection signals can be based on at least one preliminary identified signal. The at least one preliminary identified signal can be based on an identification by the carrier detection portion corresponding to one of presence and absence of communication of at least one communication signal, within a communication medium, having a frequency component corresponding to one of at least one predetermined frequency component.

The information signal can be received and processed to produce a processed information signal in a manner such that the appropriate carrier signal is modulated with the information signal. The information signal can be further processed in a manner such that the processed information signal is associable with at least one of a unique code and an indication signal. The indication signal is associable with absence of communication of the at least one communication signal in the communication medium.

The source signal can be transmitted. The processed information signal can be further processed to produce the source signal. The source signal is associable with at least one of the unique code and the indication signal. The source signal is communicable to the receiver module via the communication medium.

BRIEF DESCRIPTION OF THE DRAWINGS

Embodiments of the disclosure are described hereinafter with reference to the following drawings, in which:

FIG. 1b to FIG. 1f show, in further detail, the transmitter module and the receiver module of FIG. 1a;

FIG. 2b to FIG. 2d show, in further detail, the method of FIG. 2a;

FIG. 2e shows the receive part of FIG. 2a in further detail with respect to an exemplary scenario.

DETAILED DESCRIPTION

Representative embodiments of the disclosure, for addressing one or more of the foregoing problems associated with conventional communication systems, are described hereinafter with reference to FIG. 1 to FIG. 3.

Figure 1A:
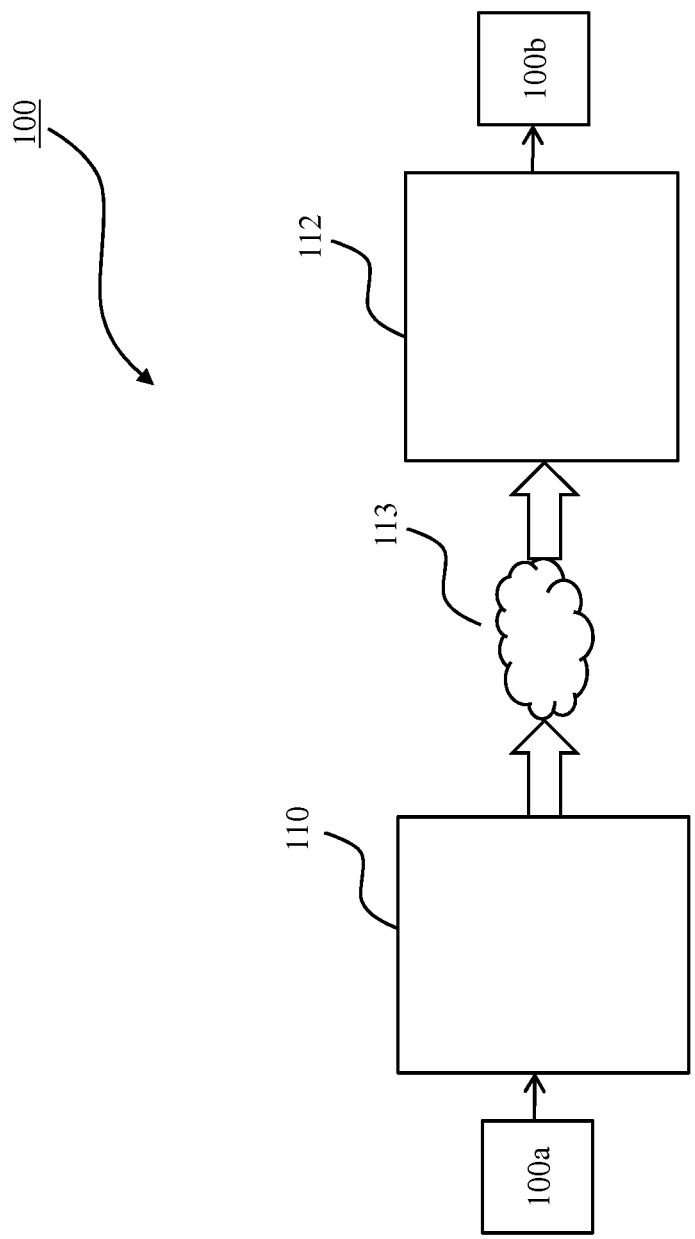
FIG. 1a shows a system which includes a transmitter module which can be coupled to an information source and a receiver module which can be coupled to an output module, according to an embodiment of the disclosure.

A system 100, in accordance with an embodiment of the disclosure, is shown in FIG. 1a. The system 100 can be coupled to an information source 100a and an output module 100b. The system 100 can be configured to receive information signals communicated from the information source 100a and process the information signals to produce output signals which can be communicated to the output module 100b.

As shown, the system 100 includes an apparatus such as a transmitter module 110 which is coupled to the information source 100a. The system 100 further includes another apparatus such as a receiver module 112 which is coupled to the output module 100b. The transmitter module 110 can be configured to signal communicate with the receiver module 112 via a communication medium 113.

Although the information source 100a is illustratively shown in Fig. 1a to be externally coupled to the transmitter module 110, it is appreciable that the information source 100a can be coupled internally to, and thus integrated with, the transmitter module 110. In this regard, the above remark pertaining to the coupling of the information source 100a and the transmitter module 110 analogously applies to the coupling of the output module 100b and the receiver module 112.

The transmitter module 110 can be configured to receive and process information signals communicated from the information source 100a to produce processed information signals. Based on the processed information signals, the transmitter module 110 communicates source signals in a manner such that the source signals can be detected and received by the receiver module 112.

Source signals communicated from the transmitter module 110 can generally correspond to communication signals communicated via the communication medium 113.

The receiver module 112 can be configured to detect and receive communication signals from the communication medium 113 such as the source signals. Specifically, the transmitter module 110 can be configured to communicate source signals to the receiver module 112 via wireless communication via the communication medium 113. More specifically, the transmitter module 110 can be configured to communicate source signals to the receiver module 112 via wireless communication via the communication medium 113 in a unidirectional manner. Even more specifically, the transmitter module 110 can be configured to communicate source signals, in a unidirectional manner, to the receiver module 112 via near field communication (NFC) based wireless communication via the communication medium 113. Thus communication between the transmitter module 110 and the receiver module 112 can be a unidirectional NFC based wireless communication via the communication medium 113. The NFC based wireless communication can be a low data bit rate based communication.

The receiver module 112 can be configured to process detected and received communication signals in a manner so as to identify source signals. The receiver module 112 can further be configured to process identified source signals in a manner so as to produce output signals which can be communicated to the output module 100b.

As mentioned earlier, the communication medium 113 can be generally regarded as a communication channel via which communication signals such as modulated carrier signals are communicated. The communication channel can be associated with a communication bandwidth corresponding to a range of frequencies. The communication medium 113 can, for example, be an aerial medium.

Further earlier mentioned, the source signals, when communicated from the transmitter module 110, correspond to communication signals communicated via the communication medium 113. Thus a source signal can be produced by modulating a carrier signal with an information signal. A carrier signal generally includes a carrier frequency component and an amplitude component. The carrier frequency component is indicative of signal frequency, and thus carrier frequency, of the carrier signal. The amplitude component is indicative of signal strength of the carrier signal.

Yet further mentioned earlier, in conventional communication systems such as that of a bidirectional communication based system having a transmitter and a receiver, verification signals are exchanged between the transmitter and the receiver to ensure that integrity of communication signals can be preserved. In this regard, requisite circuitries are generally required on both the transmitter and the receiver to allow appropriate exchange of verification signals therebetween. The inclusion of such requisite circuitries renders implementation of convention communication systems complex.

Thus as can be appreciated, since communication between the transmitter module 110 and the receiver module 112 can be a unidirectional based wireless communication, an exchange of verification signals between the transmitter and receiver modules 110/112 is not required. As an exchange of verification signals is not required, the aforementioned requisite circuitries to allow appropriate exchange of verification signals are thus not required for the system 100. Thus the system 100 is appreciably less complex in implementation as compared to conventional communication systems.

Figure 1B:
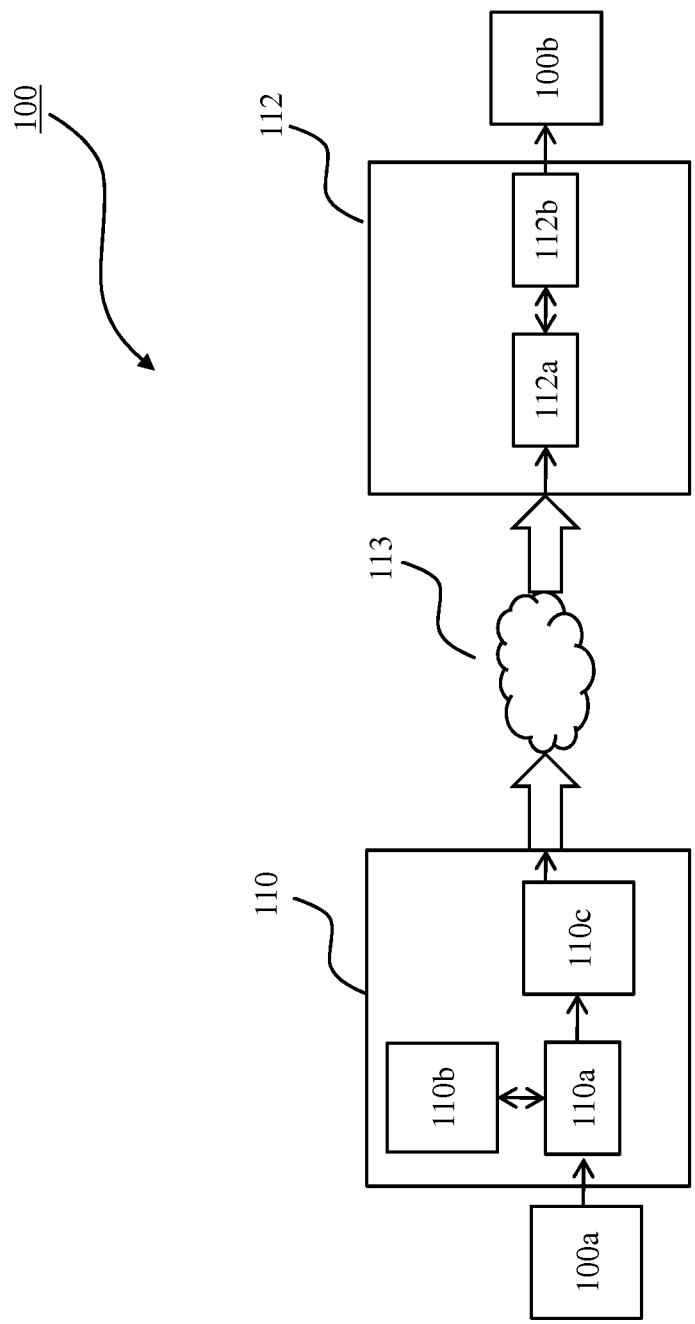

Referring to FIG. 1b, the transmitter module 110 includes a source processing portion 110a, a carrier detection portion 110b and a source transmission portion 110c. The carrier detection and source transmission portions 110b/110c are each coupled to the source processing portion 110a. The receiver module 112 includes a source detection portion 112a and a receiver processing portion 112b which is coupled to the source detection portion 112a. Additionally, the source processing portion 110a can be coupled to the information source 100a and the receiver processing portion 112b can be coupled to the output module 100b.

At the transmitter module 110, the source processing portion 110a can be configured to receive information signals from the information source 100a. The source processing portion 110a can be further configured to process the information signals to produce processed information signals in a manner which will be described in further detail with reference to FIG. 1e. Additionally, the source processing portion 110a can be configured to communicate a control signal to the carrier detection portion 110b so as to control the carrier detection portion 110b in a manner which will be described in greater detail with reference to FIG. 1c and FIG. 1d.

The carrier detection portion 110b can be configured to make an identification which can be based upon to produce detection signals. The detection signals can be communicated to the source processing portion 110a. Based on the detection signals, at least one appropriate carrier signal can be determined. More specifically, the carrier detection portion 110b can be configured to make an identification in a manner such that at least one appropriate carrier signal can be determined. An appropriate carrier signal can be determined at, for example, the source processing portion 110a. An appropriate carrier signal can be based upon to produce processed information signals as will be described in further detail with reference to FIG. 1e.

In an exemplary scenario, the carrier detection portion 110b can be configured to identify presence or absence of communication of a communication signal within the communication medium 113.

Where the carrier detection portion 110b positively identifies presence of communication of a communication signal within the communication medium 113, signal strength and carrier frequency in association thereto can be determined. If signal strength of a positively identified communication signal is considered substantial, carrier frequency in association thereto can be considered as unsuitable carrier frequency. Hence, a carrier signal having a carrier frequency component corresponding to the unsuitable carrier frequency may be deemed inappropriate for utilization to produce processed information signals.

Conversely, where absence of communication of a communication signal within the communication medium 113 has been positively identified by the carrier detection portion 110b, carrier frequency in association thereto can be considered as suitable carrier frequency. Thus a carrier signal having a carrier frequency component corresponding to the suitable carrier frequency can be deemed appropriate for utilization to produce processed information signals. A carrier signal having a carrier frequency component corresponding to the suitable carrier frequency can correspond to an appropriate carrier signal.

Alternatively, where the carrier detection portion 110b positively identifies presence of communication of a communication signal within the communication medium 113 and signal strength of the positively identified communication signal is considered negligible, carrier frequency in association thereto can be considered as suitable carrier frequency. Hence, a carrier signal having a carrier frequency component corresponding to the suitable carrier frequency may be deemed appropriate for utilization to produce processed information signals. A carrier signal having a carrier frequency component corresponding to the suitable carrier frequency can correspond to an appropriate carrier signal.

In another exemplary scenario, the carrier detection portion 110b can be configured to identify presence or absence of communication of a plurality of communication signals within the communication medium 113.

Where the carrier detection portion 110b positively identifies presence of communication of a plurality of communication signals within the communication medium 113, signal strength and carrier frequency of each in association thereto can be determined. If signal strength of each of the positively identified communication signals is considered substantial, carrier frequency of each in association thereto can be considered as unsuitable carrier frequencies. Particularly, a carrier signal having a carrier frequency component corresponding to any of the unsuitable carrier frequencies may be deemed inappropriate for utilization to produce processed information signals.

Conversely, where the carrier detection portion 110b positively identifies absence of communication of a plurality of communication signals within the communication medium 113, carrier frequencies in association thereto can be considered as suitable carrier frequencies. Therefore, a plurality of suitable carrier frequencies can be identified. Thus a carrier signal having a carrier frequency component corresponding to any of the plurality of suitable carrier frequencies can be deemed appropriate for utilization to produce processed information signals. More specifically, one suitable carrier frequency can be selected out of the plurality of suitable carrier frequencies. A carrier signal having a carrier frequency component corresponding to a suitable carrier frequency selected out of the plurality of suitable carrier frequencies can correspond to an appropriate carrier signal.

Alternatively, where the carrier detection portion 110b positively identifies presence of communication of a plurality of communication signals within the communication medium 113 and some of the positively identified communication signals have signal strength which can be considered negligible, carrier frequency in association with each of the positively identified communication signals having negligible signal strength can be considered as suitable carrier frequency. Therefore, a plurality of suitable carrier frequencies can be identified. Thus a carrier signal having a carrier frequency component corresponding to any of the plurality of suitable carrier frequencies can be deemed appropriate for utilization to produce processed information signals. More specifically, one suitable carrier frequency can be selected out of the plurality of suitable carrier frequencies. A carrier signal having a carrier frequency component corresponding to a suitable carrier frequency selected out of the plurality of suitable carrier frequencies can correspond to an appropriate carrier signal.

Selection of one suitable carrier frequency can be selected out of the plurality of suitable carrier frequencies will be discussed on further detail with reference to FIG. 2b.

Further at the transmitter module 110, based on the appropriate carrier signal, the source processing portion 110a can be configured to produce processed information signals. The processed information signals can be communicated from the source processing portion 110a to the source transmission portion 110c. The source transmission portion 110c processes the processed information signals to produce source signals which are communicated from the transmitter module 110 to the receiver module 112. The source signals can be communicated as communication signals via the communication medium 113.

At the receiver module 112, the receiver processing portion 112b can be configured to communicate a command signal to the source detection portion 112a. Based on the command signal, the source detection portion 112a can be configured to make a detection, in a manner which will be described later in further detail with reference to FIG. 1c and FIG. 1f, so as to detect and receive communication signals, corresponding to the appropriate carrier signal, from the communication medium 113. Based on the communication signals received at the source detection portion 112a, receipt signals can be communicated to the receiver processing portion 112b for further processing in a manner which will be described later in further detail with reference to FIG. 1c and FIG. 1f, to identify source signals and produce output signals. The output signals can be communicated from the receiver processing portion 112b to the output module 100b.

As mentioned earlier, in conventional communication systems, verification signals are exchanged between the transmitter and the receiver to ensure that integrity of communication signals can be preserved. Further mentioned earlier, examples of verification signals include a combination of transmit and receipt acknowledgement signals. Yet further earlier mentioned, the transmitter can be configured to resend communication signals until a positive acknowledgement signal is communicated from the receiver in response. In this regard, the utilization of verification signals in conventional communication systems is appreciably inefficient due to the requirement of the transmitter having to resend communication signals until a positive acknowledgement signal is communicated from the receiver in response.

Thus with regard to the system 100, it can be appreciated that since an appropriate carrier signal can be determined, the appropriate carrier signal can be based upon to produce source signals. Based on the appropriate carrier signal, occurrences of destructive interference during communication of the source signals via the communication medium 113 can be substantially avoided. By substantially mitigating occurrences of destructive interference during communication via the communication medium 113, integrity of the source signals during communication can be substantially preserved. Hence, in comparison with conventional communication systems, the probability of source signals being resent can be substantially reduced. Thus an avenue for efficiently preserving integrity of the source signals during communication via the communication medium 113 can be provided by the system 100.

Figure 1C:
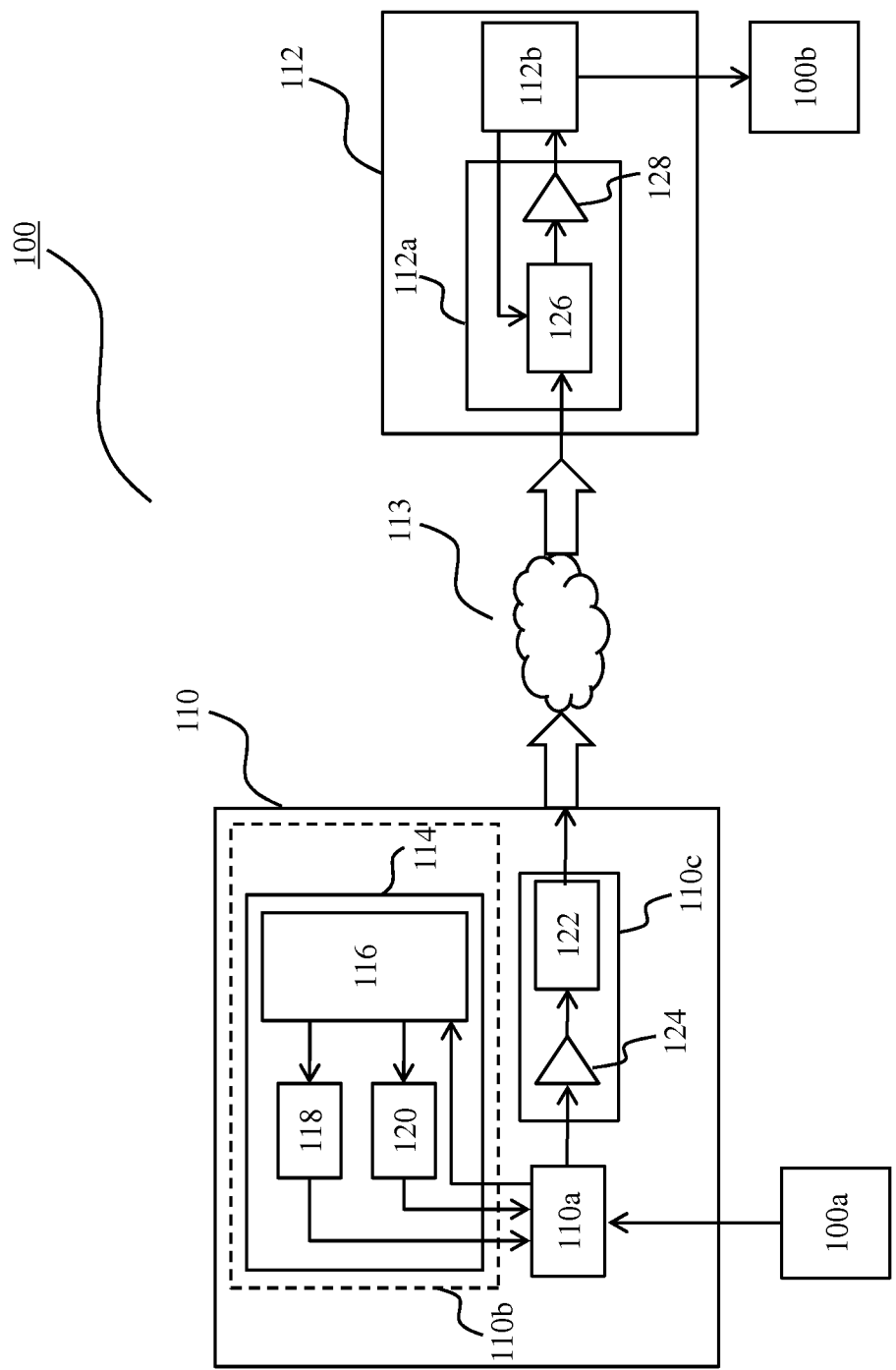

Referring to FIG. 1c, the carrier detection portion 110b can, for example, be embodied in the form of a scanning tank circuit arrangement 114 such that the carrier detection portion 110b is operable to scan the communication medium 113 to identify one of presence and absence of communication of at least one communication carrier signal therewithin. More specifically, the carrier detection portion 110b can be configured to receive a control signal from the source processing portion 110a. Based on the control signal, the scanning tank circuit arrangement 114 scans the communication medium 113 to identify one of presence and absence of communication of at least one communication signal therewithin.

The scanning tank circuit arrangement 114 can include a transmit parallel tank circuit 116. The scanning tank circuit arrangement 114 can further include one or both of a frequency detector 118 and an amplitude detector 120. The parallel tank circuit 116 can be coupled to one or both of the frequency detector 118 and the amplitude detector 120. One or both of the frequency and amplitude detectors 118/120 can be coupled to the source processing portion 110a.

The transmit parallel tank circuit 116 can be configured to scan the communication medium 113 in a manner such that a preliminary identification, of presence or absence of communication of communication signals, within communication medium 113, having frequency components corresponding to one or more predetermined frequency components, can be made. Based on the preliminary identification, one or more preliminary identified signals can be communicated from the transmit parallel tank circuit 116. As with the aforementioned carrier signal, a preliminary identified signal can have a frequency component and an amplitude component.

Furthermore, via the transmit parallel tank circuit 116, the scanning tank circuit arrangement 114 can be configured to scan the communication medium 113 based on the control signal communicated from the source processing portion 110a. More specifically, scanning of the communication medium 113 by the first parallel tank circuit 116 can be in one of a sequential manner, a random manner and predetermined manner, based on the control signal communicated from the source processing portion 110a to the carrier detection portion 110b.

Additionally, the transmit parallel tank circuit 116 is associable with a filter roll-off characteristic which is indicative of frequency response of the transmit parallel tank circuit 116. Thus depending on the filter roll-off characteristic of the transmit parallel tank circuit 116, frequency component of a preliminary identified signal may or may not substantially correspond to any of the one or more predetermined frequency components.

For example, if the transmit parallel tank circuit 116 is configured as a low order filter type such as a first order passive filter type, the filter roll-off characteristic can correspond to a roll-off rate of 20 dB/decade. Appreciably, at a roll-off rate of 20 dB/decade, a preliminary identification based on a communication signal having a frequency component adjacent to any of the one or more predetermined frequency components may potentially be made by the transmit parallel tank circuit 116. Thus a preliminary identified signal communicated from the transmit parallel tank circuit 116 may potentially be undesirably based on a communication signal, in the communication medium 113, having a frequency component adjacent to any of the one or more predetermined frequency components. In this regard, the frequency detector 118, as will be discussed later in further detail, can be configured to confirm whether or not the frequency component of a preliminary identified signal corresponds to any of the one or more predetermined frequency components. In this manner, a preliminary identified signal having a frequency component which corresponds to any of the one or more predetermined frequency components can be differentiated from a preliminary identified signal having a frequency component which does not.

Alternatively, the transmit parallel tank circuit 116 can be configured as a filter of a type which has an order higher than that of a first order filter type such that occurrences of a preliminary identification based on a communication signal having a frequency component adjacent to any of the one or more predetermined frequency components can be avoided. For example, the transmit parallel tank circuit 116 can be configured as a third order passive filter type having a filter roll-off characteristic corresponding to a roll-off rate of 60 dB/decade. Appreciably, as compared to a first order passive filter type, occurrences of an identification of a communication signal having a frequency component adjacent to any of the one or more predetermined frequency components can be substantially avoided. In this regard, inclusion of the frequency detector 118 can be optional. The scanning tank circuit arrangement 114, more particularly the transmit parallel tank circuit 116, will be discussed later in further detail with reference to FIG. 1d.

Based on preliminary identification by the transmit parallel tank circuit 116, one or more preliminary identified signals can be communicated from the transmit parallel tank circuit 116 and received by one or both of the frequency detector 118 and the amplitude detector 120. A preliminary identified signal can be indicative of one of presence and absence of a communication signal, within the communication medium 113, having a frequency component corresponding to any of the one or more predetermined frequency components.

In an event where presence of communication, in the communication medium 113, of a communication signal having a frequency component corresponding to any of the one or more predetermined frequency components is identified, a preliminary identified signal indicative thereof can be communicated to one or both of the frequency detector 118 and the amplitude detector 120.

Earlier mentioned, the frequency detector 118 can be configured to confirm whether or not the frequency component of the preliminary identified signal corresponds to any of the one or more predetermined frequency components. In one example, where the frequency detector 118 confirms that the frequency component of the preliminary identified signal corresponds to any of the one or more predetermined frequency components, a positive frequency detection signal is communicated from the frequency detector 118. Otherwise, a null frequency detection signal is communicated from the frequency detector 118. Confirmation by the frequency detector 118 can be a frequency match based confirmation. For example, based on a comparison by the frequency detector 118, if the frequency component of the preliminary identified signal substantially matches any one of the predetermined frequency components, a positive frequency detection signal is communicated. Otherwise, a null frequency detection signal is communicated. A null signal can indicate a possible error during scanning of the communication medium 113 by the transmit parallel tank circuit 116. Thus if a null frequency detection signal is communicated, the source processing portion 110a can be configured to communicate a control signal to the transmit parallel tank circuit 116 to rescan the communication medium 113.

Additionally, the amplitude detector 120 can be configured to detect the amplitude component of the preliminary identified signal. Based on detection of the amplitude component by the amplitude detector 120, signal strength of the preliminary identified signal can be determined. Determination of signal strength can be an amplitude threshold based determination. For example, if the amplitude component of the preliminary identified signal detected by the amplitude detector 120 is above a predetermined amplitude threshold, signal strength of the preliminary identified signal can be considered substantial. Otherwise, where the amplitude component is below a predetermined amplitude threshold, signal strength of the preliminary identified signal can be considered negligible.

Furthermore, signal strength can be determined by at least one of the amplitude detector 120 and the source processing portion 110a.

In one embodiment, where signal strength is determined by the amplitude detector 120, the amplitude detector 120 communicates a positive strength detection signal when signal strength of the preliminary identified signal is considered to be substantial. Otherwise, where signal strength of the preliminary identified signal is considered negligible, the amplitude detector 120 communicates a negative strength detection signal.

In another embodiment, where signal strength is determined by the source processing portion 110a, the amplitude detector 120 communicates an amplitude detection signal corresponding to the detected amplitude component of the preliminary identified signal to the source processing portion 110a. Based on the amplitude detection signal, signal strength of the preliminary identified signal can be determined by the source processing portion 110a via, for example, the aforementioned amplitude threshold based determination.

Analogously, the aforementioned frequency match based confirmation by the frequency detector 118 can also be determined at the source processing portion 110a.

In this regard, it is appreciable that one or both of the frequency detector 118 and the amplitude detector 120 can optionally be incorporated within the source processing portion 110a.

In another event where absence of communication, in the communication medium 113, of a communication signal having a frequency component corresponding to any of the one or more predetermined frequency components is identified, a preliminary identified signal corresponding thereto can be communicated to one or both of the frequency detector 118 and the amplitude detector 120.

In this regard, a negative frequency detection signal and a negative strength detection signal can be communicated, respectively, from the frequency detector 118 and the amplitude detector 120.

Earlier mentioned, based on detection signals produced by the carrier detection portion 110b, at least one appropriate carrier signal, which can be utilized for modulation to produce processed information signals, can be determined.

In one embodiment, the detection signals can be based on one of a negative frequency detection signal, a negative strength detection signal and an amplitude detection signal. In another embodiment, the detection signals can be based on a negative frequency detection signal in combination with one of a negative strength detection signal and an amplitude detection signal, or a positive frequency detection signal in combination with one of a negative strength detection signal and an amplitude detection signal. In yet another embodiment, the detection signals can be based on one or both of the predetermined frequency component and the amplitude detection signal.

Referring further to FIG. 1c, the source transmission portion 110c can include a transmit tank circuit arrangement 122 which can be coupled to the source processing portion 110a. The source transmission portion 110c can further include a transmit driver portion 124 via which the transmit tank circuit arrangement 122 can be coupled to the source processing portion 110a.

In one embodiment, processed information signals from the source processing module 110a can be received at the transmit tank circuit arrangement 122. The transmit tank circuit arrangement 122 can be configured to process the processed information signals in a manner so as to produce source signals.

In another embodiment, processed information signals from the source processing module 110a can be received at the transmit driver portion 124. The transmit driver portion 124 can be configured to process the processed information signals in a manner so as to produce transmit tank circuit input signals. The transmit tank circuit input signals can be received by the transmit tank circuit arrangement 122 for further processing to produce source signals.

The transmit driver portion 124 can be a buffer configuration which can one of boost signal strength of the processed information signals and attenuate signal strength of the processed information signals. Additionally, the transmit driver portion 124 can be a buffer configuration which can provide impedance isolation between the transmit tank circuit arrangement 122 and the source processing portion 110a. Examples of a buffer configuration include a voltage buffer configuration and a current buffer configuration.

Further shown in FIG. 1c, the source detection portion 112a of the receiver module 112, in one embodiment, includes a receive tank circuit arrangement 126 which is coupled to the receiver processing portion 112b. The receive tank circuit arrangement 126 can be configured to detect and receive communications signals, corresponding to the appropriate carrier signal, from the communication medium 113, and communicate receipt signals to receiver processing portion 112b. The receive tank circuit arrangement 126 can, for example, be configured to detect and receive communication signals based on the aforementioned appropriate carrier signal. The receive tank circuit arrangement 126 can, for example, be a receive parallel tank circuit which is analogous to the transmit parallel tank circuit 116. In this regard, the earlier discussions pertaining to the transmit parallel tank circuit 116 analogously apply.

The source detection portion 112a, in another embodiment, further includes a receive driver portion 128 via which the receive tank circuit arrangement 126 can be coupled to the receiver processing portion 112b. Communication signals received at the receive tank circuit arrangement 126 can be communicated to the receive driver portion 128 for further processing to produce processed communication signals. The processed communication signals correspond to the receipt signals which are communicated from the source detection portion 112a to the receiver processing portion 112b. The receive driver portion 128 is analogous to the transmit driver portion 124. In this regard, the earlier discussions pertaining to the transmit driver portion 124 analogously apply.

Thus, one of the communication signals and the processed communication signals can be communicated as receipt signals from the source detection portion 112a to the receiver processing portion 112b. As mentioned earlier, the receiver processing portion 112b receives the receipt signals for further processing to identify source signals and produce output signals which can be communicated to the output module 110b.

Figure 1D:
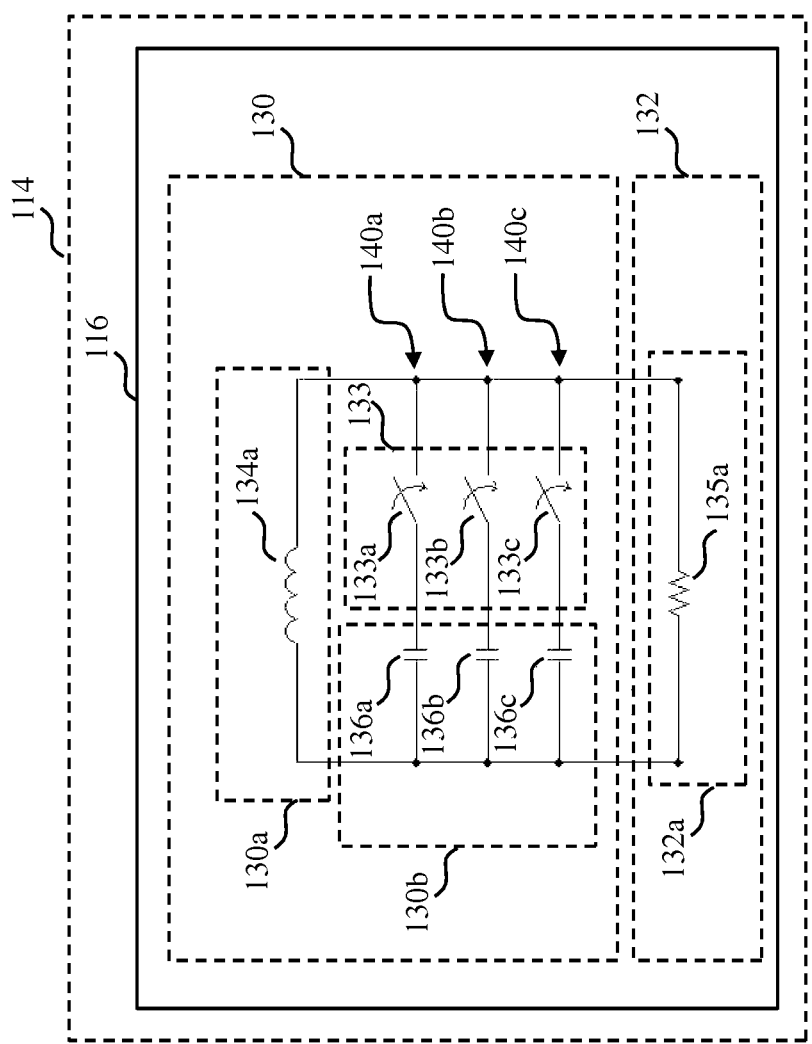

Referring to FIG. 1d, the transmit parallel tank circuit 116 of the scanning tank circuit arrangement 114, as shown in FIG. 1c, is shown in greater detail.

The transmit parallel tank circuit 116 includes a reactance portion 130 and a resistance portion 132 which can be coupled in a parallel arrangement. The transmit parallel tank circuit 116 further includes a transmit switch array 133 which can be coupled to a portion of the reactance portion 130 in a series arrangement. The transmit switch array 133 can be further coupled (not shown) to the source processing portion 110a in a manner so as to receive the control signal. Hence the transmit switch array 133 is controllable by the control signal.

The reactance portion 130 includes a first type reactance portion 130a and a second type reactance portion 130b.

In one embodiment, the first type reactance portion 130a includes a first type reactance component and the second type reactance portion 130b includes a second type reactance component. In another embodiment, the first type reactance portion 130a includes the second type reactance component and the second type reactance portion 130b includes the first type reactance component.

The first type reactance component can, for example, be an inductance type component and the second type reactance component can, for example, be a capacitance type component. An example of an inductance type component is an inductor having an inductance. Additionally, an example of a capacitance type component is a capacitor having a capacitance.

The resistance portion 132 includes a resistance type component 132a. An example of a resistance type component 132a is a resistor having a resistance.

As mentioned earlier, the transmit switch array 133 can be coupled to a portion of the reactance portion 130 in a series arrangement. More specifically, the transmit switch array 133 can be coupled to either the first type reactance type portion 130a or the second type reactance type portion 130b in a series arrangement.

In one embodiment, the transmit switch array 133 is coupled to the first type reactance portion 130a in a series arrangement such that the first type reactance portion 130a is in series connection with the transmit switch array 133. Therefore, the first type reactance portion 130a and the switch transmit array 133, when in series connection, are coupled to the second type reactance portion 130b in a parallel arrangement.

In another embodiment, the transmit switch array 133 is coupled to the second type reactance portion 130b in a series arrangement such that the second type reactance portion 130b is in series connection with the transmit switch array 133. Therefore, the second type reactance portion 130b and the transmit switch array 133, when in series connection, are coupled to the first type reactance portion 130a in a parallel arrangement.

In one exemplary arrangement, as shown, the first type reactance portion 130a includes a first inductor 134a and the resistance portion 132 includes a first resistor 135a. The second type reactance portion 130b includes a plurality of second type reactance components such as capacitors. More specifically, the second type reactance portion 130b includes a first capacitor 136a, a second capacitor 136b and a third capacitor 136c. The transmit switch array 133 is coupled to the second type reactance portion 130b in a series arrangement. The transmit switch array 133 includes a plurality of switches corresponding to the plurality of capacitors in the second type reactance portion 130b. More specifically, the transmit switch array 133 includes a first switch 133a, a second switch 133b and a third switch 133c. The first, second and third switches 133a/133b/133c are coupled, respectively, to the first, second and third capacitors 136a/136b/136c in a series arrangement.

When respectively coupled in series arrangement, one capacitor from the plurality of capacitors and one switch from the plurality of switches form a reactance-switch combination. More specifically, the first capacitor 136a and the first switch 133a, when coupled in a series arrangement, form a first reactance-switch combination 140a. The second capacitor 136b and the second switch 133b, when coupled in a series arrangement, form a second reactance-switch combination 140b. The third capacitor 136c and the third switch 133c, when coupled in a series arrangement, form a third reactance-switch combination 140c. As shown, the first, second and third reactance-switch combinations 140a/140b/140c are coupled to each other in a parallel arrangement. Further shown, the first inductor 134a is coupled to each of the first, second and third reactance-switch combinations 140a/140b/140c in a parallel arrangement. Furthermore, the first inductor 134a and the first resistor 135a are coupled in a parallel arrangement.

As mentioned earlier, the transmit switch array 133 is controllable by the control signal. More specifically, the plurality of switches in the transmit switch array 133 can be controlled by the control signal such that each of them is either in an open circuit position or a closed circuit position.

When one or more of the switches from the plurality of switches in the transmit switch array 133 are in a closed circuit position, the corresponding one or more capacitors coupled in a series arrangement thereto can be coupled to the first inductor 134a in a parallel arrangement. Conversely, when one or more of the switches from the plurality of switches in the transmit switch array 133 are in an open circuit position, the corresponding one or more capacitors coupled in a series arrangement thereto is or are not coupled to the first inductor 134a in a parallel arrangement.

When the first inductor 134a and one or more capacitors are coupled in a parallel arrangement, a resonance frequency (f) can be determined based on the equation as follows:

$$f = \frac{1}{2\pi\sqrt{LC}}$$

In the above equation, "f" refers to the resonance frequency, "L" refers to inductance of the first inductor 134a and "C" refers to either capacitance of a capacitor coupled to the first inductance 134a in a parallel arrangement or equivalent capacitance of more than one capacitor coupled to the first inductance 134a in a parallel arrangement.

Earlier mentioned, the transmit parallel tank circuit 116 can be configured to scan the communication medium 113 in a manner such that a preliminary identification, of presence or absence of communication of communication signals having frequency components corresponding to one or more predetermined frequency components, can be made. Hence the resonance frequency (f) in the abovementioned equation corresponds to a predetermined frequency component from the abovementioned one or more predetermined frequency components.

In one example, when the first switch 133a in the first reactance-switch combination 140a is controlled by the control signal such that it is in a closed circuit position, the first capacitor 136a is coupled to the first inductor 134a in a parallel arrangement. When the first inductor 134a and the first capacitor 136a are coupled in a parallel arrangement, a resonance frequency (f) can be determined based on inductance (L) of the first inductor 134a and capacitance (C) of the first capacitor 136a. Thus based on the resonance frequency (f), one predetermined frequency component can be defined.

In another example, when the first and second switches 133a/133b in the respective first and second reactance-switch combinations 140a/140b are controlled by the control signal such that they are in a closed circuit position, the first capacitor 136a, the second capacitor 136b and the first inductor 134a are coupled to each other in a parallel arrangement. An equivalent capacitance (C) based on the first and second capacitors 136a/136b, when coupled in a parallel arrangement, can be determined. Based on the equivalent capacitance (C) of the first and second capacitors 136a/136b and inductance (L) of the first inductor 134a, another resonance frequency (f) can be determined. Thus another predetermined frequency component can be defined.

Further mentioned earlier, scanning of the communication medium 113 by the transmit parallel tank circuit 116 can be in one of a sequential manner, a random manner and predetermined manner, based on the control signal communicated from the source processing portion 110a to the carrier detection portion 110b.

In one embodiment, where scanning of the communication medium 113 in a sequential manner is desired, the control signal can be communicated to control the transmit switch array 133 such that the first to third switches 133a/133b/133c switch between an open and closed circuit position in a sequential manner. The sequential manner can be, for example, switching of the first switch 133a followed by the second switch 133b followed by the third switch 133c followed again by the first switch 133a and so on.

In another embodiment, where scanning of the communication medium 113 in a random manner is desired, the control signal can be communicated to control the transmit switch array 133 such that the first to third switches 133a/133b/133c switch between an open and closed circuit position in a random manner. The random manner can be, for example, switching of the first switch 133a followed by the third switch 133c followed by the second switch 133b followed again by the third switch 133c and so on.

In yet another embodiment, where scanning of the communication medium 113 in a predetermined manner is desired, the control signal can be communicated to control the transmit switch array 133 such that the first to third switches 133a/133b/133c switch between an open and closed circuit position in a predetermined manner. An example of the predetermined manner can be switching, in a periodic fashion, of the first switch 133a followed by the third switch 133c followed by the second switch 133b. A further example of the predetermined manner can be switching, in a periodic fashion, of the first and second switches 133a/133b together followed by the third switch 133c.

Thus, it is appreciable that the first to third reactance-switch combinations 140a/140b/140c and the first inductor 134a coupled in a parallel arrangement, in combination with control by the control signal, provides flexibility in the manner in which the carrier detection portion 110b makes an identification which can be based upon to produce detection signals.

In particular, depending on control of the transmit switch array 133 by the control signal, up to seven different predetermined frequency components can be determined. Thus the carrier detection portion 110b can be configured to identify presence of communication of up to seven different communication signals within the communication medium 113. Furthermore, depending on whether less or more predetermined frequency components are to be determined, the number of reactance-switch combinations can be correspondingly decreased or increased. For example, if more than seven different predetermined frequency components are to be determined, another reactance-switch combination (not shown) can be included in addition to the first to third reactance-switch combinations 140a/140b/140c.

Additionally, depending on the control signal communicated from the source processing portion 110a, scanning of the communication medium 113 by the first parallel tank circuit 116 can be in one of a sequential manner, a random manner and predetermined manner. In this manner, flexibility in the manner in which the carrier detection portion 110b makes an identification which can be based upon to produce detection signals can be further increased.

Figure 1E:
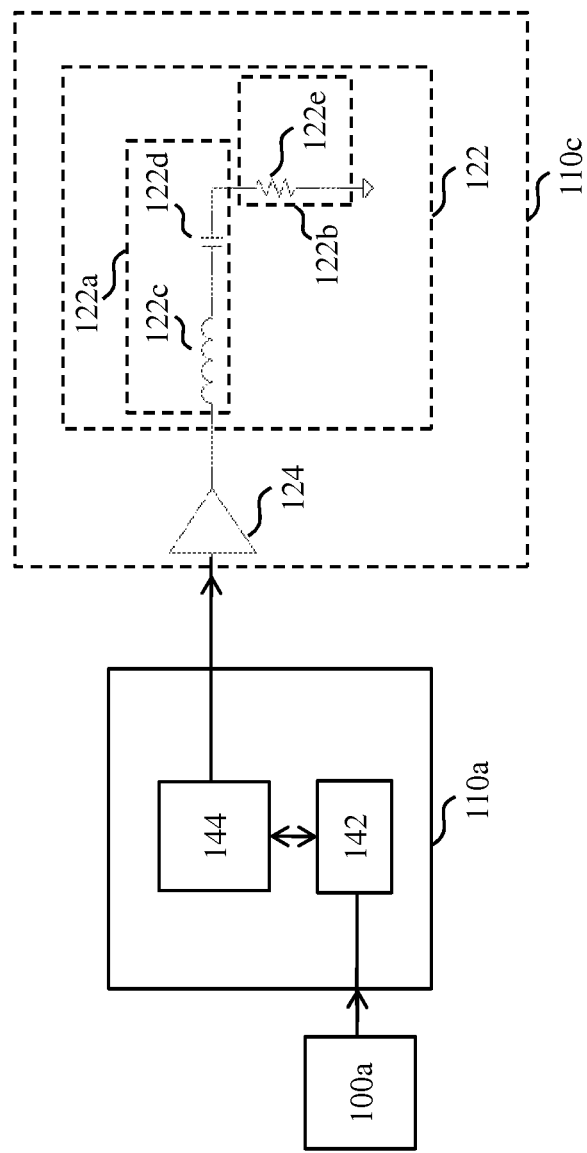

Referring to FIG. 1e, the source processing portion 110a and the source transmission portion 110c of the transmitter module 110 are shown in further detail. More specifically, the source processing portion 110a and the transmit tank circuit arrangement 122 of the source transmission portion 110c are shown in greater detail.

As mentioned earlier in FIG. 1b, the source processing portion 110a can be configured to receive information signals from the information source 100a for processing to produce processed information signals. Further earlier mentioned earlier in FIG. 1b, the carrier detection portion 110b can be configured to make an identification in a manner such that at least one appropriate carrier signal can be determined. An appropriate carrier signal can be based upon to produce processed information signals.

As shown, the source processing portion 110a includes a modulation portion 142. The source processing portion 110a can further include an encoding portion 144 coupled to the modulation portion 142.

Mentioned earlier, the information source 100a is coupled to the source processing portion 110a. More specifically, the information source 100a can be coupled to either the modulation portion 142 or the encoding portion 144.

In one embodiment, the modulation portion 142 is coupled to the information source 100a. The modulation portion 142 can be configured to receive an information signal from the information source 100a. The modulation portion 142 modulates an appropriate carrier signal with the information signal to produce a modulated appropriate carrier signal. The modulated appropriate carrier signal corresponds to a processed information signal.

In another embodiment, as shown, the modulation portion 142 is coupled to the information source 100a and the encoding portion 144. The modulation portion 142 can be configured to receive an information signal from the information source 100a. The modulation portion 142 modulates an appropriate carrier signal with the information signal to produce a modulated appropriate carrier signal which is communicated to the encoding portion 144 for further processing. The encoding portion 144 processes the modulated appropriate carrier signal by encoding it with a unique code to produce a first type encoded signal. The first type encoded signal corresponds to a processed information signal.

In yet another embodiment, the encoding portion 144 is coupled to the information source 100a and the modulation portion 142. The encoding portion 144 can be configured to receive an information signal from the information source 100a. The encoding portion 144 processes the information signal by encoding it with a unique code to produce an encoded information signal. The encoded information signal is communicated to the modulation portion 142 which modulates an appropriate carrier signal with the encoded information signal to produce a second type encoded signal. The second type encoded signal corresponds to a processed information signal.

In yet a further embodiment, where a negative frequency detection signal is communicated to the source processing portion 110a due to identification, by the carrier detection portion 110b, of absence of communication, in the communication medium 113, of a communication signal having a frequency component corresponding to any of the one or more predetermined frequency components, the source processing portion 110a can be configured to process information signals such that an indicator signal indicative of the negative frequency detection signal can be one of associated with the processed information signals and included with the processed information signals.

Earlier mentioned, the source transmission portion 110c can be coupled to the source processing portion 110a. More specifically, the transmission portion 110c can be coupled to either the modulation portion 142 or the encoding portion 144. For example, as shown, the transmission portion 110c, more specifically the transmit driver portion 124, can be coupled to the encoding portion 144. Further earlier mentioned, processed information signals can be communicated from the source processing portion 110a to the source transmission portion 110c for further processing to produce source signals.

Thus, a source signal communicated from the transmitter module 110 is associable with one or both of a unique code and an indicator signal based on processing by the source processing portion 110a.

Further shown in FIG. 1e, the transmit tank circuit arrangement 122 includes a transmit reactance portion 122a and a transmit resistance portion 122b coupled thereto in a series arrangement.

The transmit reactance portion 122a includes, for example, the aforementioned first type reactance component and the aforementioned second type reactance component. As shown, the first type reactance component corresponds to, for example, an inductance type component such as a transmit inductor 122c and the second type reactance component corresponds to, for example, a capacitance type component such as a transmit capacitor 122d. The transmit resistance portion 122b includes, for example, a resistance type component such as a transmit resistor 122e. Furthermore, the transmit reactance portion 122a and the transmit resistance portion 122b can be coupled in a series arrangement such that, for example, the transmit inductor 122c is coupled to the transmit capacitor 122d which is in turn coupled to the transmit resistor 122e.

Figure 1F:
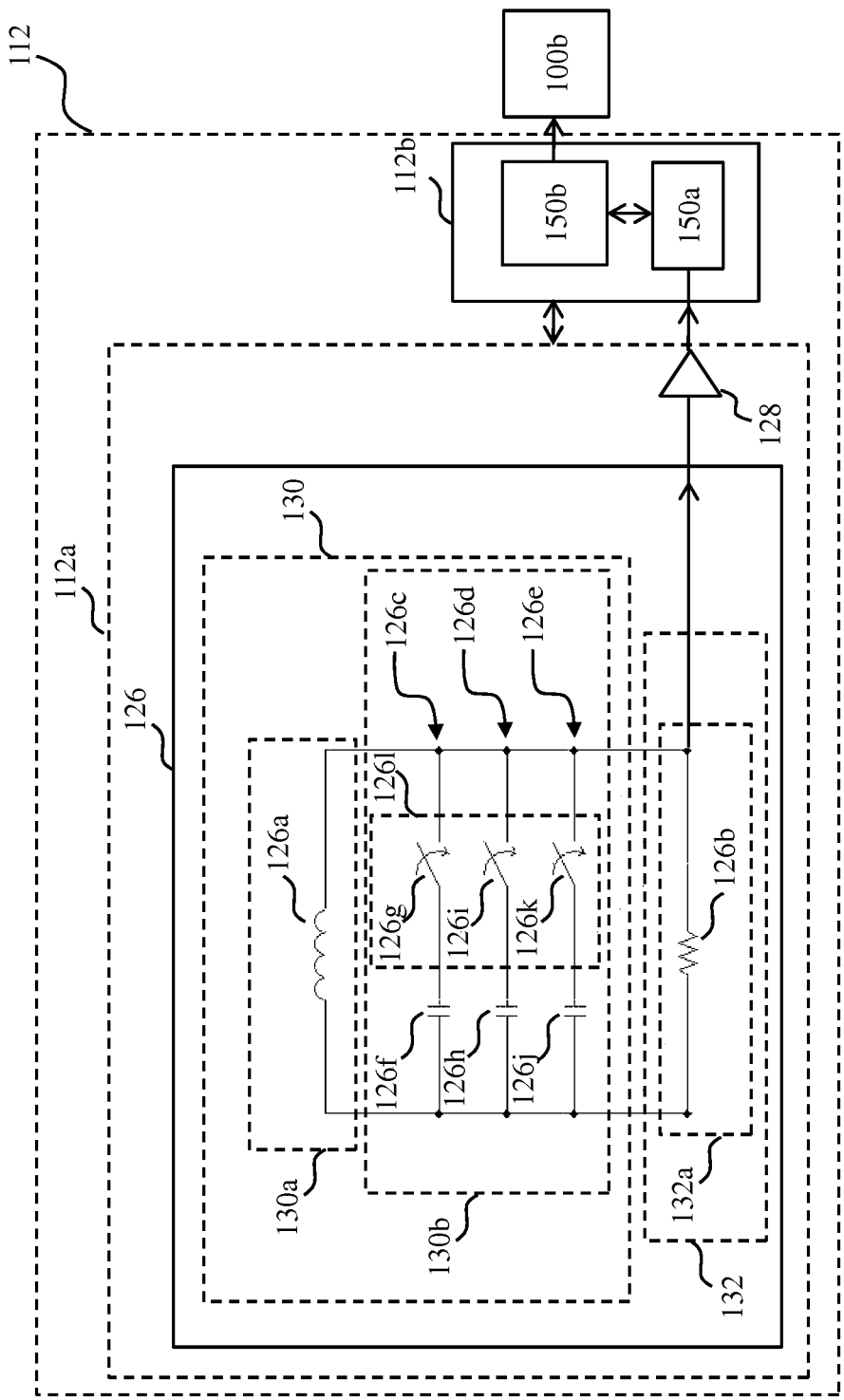

Referring to FIG. 1f, the receive tank circuit arrangement 126 and the receiver processing portion 112b of the receiver module 112 are shown in greater detail. As mentioned earlier, the receive tank circuit arrangement 126 can, for example, be a parallel tank circuit which is analogous to the transmit parallel tank circuit 116. In this regard, the earlier discussions, such as at least that in FIG. 1d, pertaining to the transmit parallel tank circuit 116 analogously apply.

Thus as shown, the receive tank circuit arrangement 126 can include a second inductor 126a and a second resistor 126b corresponding to the first inductor 134a and the first resistor 135a respectively.

The receive tank circuit arrangement 126 can further include a fourth reactance-switch combination 126c, a fifth reactance-switch combination 126d and a sixth reactance-switch 126e. The fourth to sixth reactance-switch combination 126c/126d/126e correspond, respectively, to the first to third reactance-switch combination 140a/140b/140c.

The fourth reactance-switch combination 126c includes a fourth capacitor 126f and a fourth switch 126g. The fifth reactance-switch combination 126d includes a fifth capacitor 126h and a fifth switch 126i. The sixth reactance-switch combination 126e includes a sixth capacitor 126j and a sixth switch 126k. The fourth to sixth switches 126g/126i/126k form a receive switch array 126l corresponding to the transmit switch array 133.

Further mentioned earlier, the receiver processing portion 112b can be configured to communicate a command signal to the source detection portion 112a. Based on the command signal, the source detection portion 112a can be configured to make a detection so as to detect and receive communication signals, corresponding to the appropriate carrier signal, from the communication medium 113. More specifically, based on the command signal, the source detection portion 112a can be configured to make a detection so as to detect and receive source signals communicated from the transmitter module 110.

Thus, as with the control signal of the source processing portion 110a, the command signal of the receiver processing portion 112b can be configured to control the receive switch array 126l in one of a sequential manner, a random manner and a predetermined manner. In this regard, the foregoing discussion pertaining to the control signal and the transmit switch array 133 analogously applies.

Control of the source detection portion 112a by the receiver processing portion 112b via the command signal will be discussed further hereinafter with reference to exemplary command control strategies which include a first command control strategy and a second command control strategy.

In the first command control strategy, detection of a communication signal corresponding to an appropriate carrier signal can be based on control of the receive switch array 126l in any of a random manner, a sequential manner and a predetermined manner as mentioned earlier.

In the second command control strategy, detection of a communication signal corresponding to an appropriate carrier signal can be based on control of the receive switch array 126l in any of a random manner, a sequential manner and a predetermined manner corresponding to control of the transmit switch array 133 by the control signal. More specifically, the manner of control of the receive switch array 126l can be synchronized with the manner of control of the transmit switch array 133. For example, where the transmit switch array 133 is controlled by the control signal in a predetermined manner such that switching of the first and second switches 133a/133b together is followed by switching of the third switch 133c in a periodic fashion, the receive switch array 126l can correspondingly be controlled by the command signal such that switching of the fourth and fifth switches together 126g/126i is followed by the switching of the sixth switch 126k in a periodic fashion. In this manner, the manner of control of the transmit switch array 133 and the receive switch array 126l by the respective control signal and command signal can be synchronized.

Earlier mentioned, based on the communication signals received at the source detection portion 112a, receipt signals can be communicated to the receiver processing portion 112b for further processing in a manner to identify source signals and produce output signals. Further mentioned earlier, a source signal communicated from the transmitter module 110 is associable with one or both of a unique code and an indicator signal based on processing by the source processing portion 110a.

Therefore receipt signals communicated from the source detection portion 112a can correspondingly be associated with one or both of a unique code and an indicator signal.

Identification of source signals will be discussed in further detail with reference to exemplary source identification strategies which include a first source identification strategy, a second source identification strategy and a third source identification strategy.

In the first source identification strategy, the receiver module 112 can be configured, at for example the receiver source processing portion 112b, to recognize the unique code. Based on a positive recognition of the unique code, a positive identification of a source signal can be made. Specifically, the receipt signal communicated from the source detection portion 112a can thus be positively identified as a source signal. Otherwise, the receipt signal communicated from the source detection portion 112a can be identified as a spurious signal.

In the second source identification strategy, the receiver module 112 can be configured, at for example the receiver source processing portion 112b, to recognize the indicator signal. Based on a positive recognition of the indicator signal, a positive identification of a source signal can be made. Specifically, the receipt signal communicated from the source detection portion 112a can thus be positively identified as a source signal. Otherwise, the receipt signal communicated from the source detection portion 112a can be identified as a spurious signal.

In the third source identification strategy, the receiver module 112 can be configured, at for example the receiver source processing portion 112b, to recognize the unique code and the indicator signal. Based on a positive recognition of the unique code and the indicator signal, a positive identification of a source signal can be made. Specifically, the receipt signal communicated from the source detection portion 112a can thus be positively identified as a source signal. Otherwise, the receipt signal communicated from the source detection portion 112a can be identified as a spurious signal.

In an event where the receipt signals can be identified as source signals, the receiver processing portion 112b processes the receipt signals in a manner so as to produce output signals.

In another event where the receipt signals can be identified as spurious signals, processing of the receipt signals by the receiver processing portion 112b can be impeded. Thus output signals are not produced.

Referring further to FIG. 1f, the receiver processing portion 112b includes a demodulation portion 150a. The receiver processing portion 112b can further include a decoding portion 150b which can be coupled to the demodulation portion 150a. The receiver processing portion 112b can yet further include a recognition module (not shown).

Earlier mentioned, receipt signals are communicated from the source detection portion 112a to the receiver processing portion 112b. Further earlier mentioned, receipt signals can be processed by the receiver processing portion 112b to produce output signals. More specifically, receipt signals positively identified as source signals can be processed in a manner such that information signals can be extracted therefrom by the receiver processing portion 112b to produce output signals. The output signals can be communicated from the receiver processing portion 112b to the output module 100b.

Further mentioned earlier, the output module 100b can be coupled to the receiver processing portion 112b. More specifically, the output module 100*b* can be coupled to either the demodulation portion 150*a* or the decoding portion 150*b*.

In one embodiment, the demodulation portion 150*a* is coupled to the source detection portion 112*a* in a manner so as to receive receipt signals. Specifically, the demodulation portion 150*a* can be coupled to the receive tank circuit arrangement 126. More specifically, the demodulation portion 150*a* can be coupled to the receive tank circuit arrangement 126 via the receive driver portion 128. The demodulation portion 150*a* is further coupled to the output module 100*b*. The demodulation portion 150*a* can optionally be configured to recognize the indicator signal so as to positively identify the receipt signals as source signals. Preferably the demodulation portion 150*a* processes the receipt signals by demodulating them to produce demodulated receipt signals. Alternatively, the demodulation portion 150*a* processes the receipt signals positively identified as source signals by demodulating them to produce demodulated receipt signals. In this manner information signals can be extracted from the receipt signals to produce output signals. Output signals can be communicated to the output module 100*b* from the demodulation portion 150*a*.

In another embodiment, as shown, the demodulation portion 150*a* is coupled to the source detection portion 112*a* in a manner so as to receive receipt signals. Specifically, the demodulation portion 150*a* can be coupled to the receive tank circuit arrangement 126. More specifically, the demodulation portion 150*a* can be coupled to the receive tank circuit arrangement 126 via the receive driver portion 128. The decoding portion 150*b* is coupled to the demodulation portion 150*a* and the output module 100*b*. The demodulation portion 150*a* processes the receipt signals by demodulating the receipt signals to produce demodulated receipt signals. The decoding portion 150*b* can be configured to receive the demodulated receipt signals. The decoding portion 150*b* can be further configured to recognize one or both of the unique code and the indicator signal to positively identify the demodulated receipt signals as source signals. The decoding portion 150*b* can further process the demodulated receipt signals identified as source signals by decoding them. In this manner information signals can be extracted from the receipt signals to produce output signals. Output signals can be communicated to the output module 100*b* from the decoding portion 150*b*.

In yet another embodiment, the decoding portion 150*b* is coupled to the source detection portion 112*a* in a manner so as to receive receipt signals. Specifically, the decoding portion 150*b* can be coupled to the receive tank circuit arrangement 126. More specifically, the decoding portion 150*b* can be coupled to the receive tank circuit arrangement 126 via the receive driver portion 128. The demodulation portion 150*a* is coupled to the decoding portion 150*b* and the output module 100*b*. The decoding portion 150*b* can be configured to recognize one or both of the unique code and the indicator signal so as to positively identify the receipt signals as source signals. The decoding portion 150*b* processes the receipt signals positively identified as source signals by decoding them to produce decoded receipt signals. The demodulation portion 150*a* can be configured to receive and process the decoded receipt signals by demodulating them. In this manner information signals can be extracted from the receipt signals to produce output signals. Output signals can be communicated to the output module 100*b* from the demodulating portion 150*a*.

In yet a further embodiment, the receiver processing portion 112*b* can yet further include the recognition module (not shown) for recognition of one or both of the unique code and the indicator signal. The recognition module can be coupled to one or both of the demodulation and decoding portions 150*a*/150*b*. The recognition module can be further coupled to the source detection portion 112*a* to receive receipt signals. Receipt signals positively identified as source signals by the recognition module can be further processed by the demodulation portion 150*a* and the decoding portion 150*b* by way of demodulation and decoding, respectively, as discussed earlier.

As mentioned earlier, integrity of a source signal can be substantially preserved during communication via the communication medium 113 by producing the source signal based on an appropriate carrier signal. Further mentioned earlier, based on processing by the source processing portion 110*a*, a source signal communicated from the transmitter module 110 is associable with one or both of a unique code and an indicator signal.

Thus, it can be appreciated that in addition to producing a source signal based on an appropriate carrier signal, association of a source signal with one or both of a unique code and an indicator signal further facilitates preservation of integrity of a source signal during communication via the communication medium 113.

Furthermore, source signals can be detected by the source detection portion 112*a* at the receiver module 112. Detection by the source detection portion 112*a* is thus based on detection of the appropriate carrier signal to which a source signal is associated. In this manner, integrity of the output signals can be assured. It is appreciable that integrity of output signals communicated to the output module 100*b* is thus based on integrity of detection by the source detection portion 112*a*.

To further assure integrity of the output signals, the receiver module 112 can be configured to recognize one or both of the unique code and the indicator signal associable with a source signal. More specifically, the receiver processing portion 112*b*, as discussed earlier, can be configured to recognize one or both of the unique code and the indicator signal associable with a source signal. It is appreciable that by recognizing one or both of the unique code and the indicator signal at the receiver module 112, integrity of the output signals communicated to the output module 100*b* can be based on one or both of unique code recognition and signal indicator recognition in addition to integrity of detection by the source detection portion 112*a*. In this manner, integrity of the output signals can be further assured.

Furthermore, it is also appreciable communication signals detected and received by the source detection portion 112*a* may be associated with one or both of spurious signals and source signals. Integrity of the system 100 may potentially be compromised if spurious signals are detected and output signals are based on such spurious signals.

Thus, by configuring the receiver module 112, more particularly at the receiver processing portion 112*b*, to recognize one or both of the unique code and the indicator signal, the probability of the output signals being based on the aforementioned spurious signals can be substantially reduced. In this manner, only receipt signals corresponding to source signals associable with one or both of a unique code and an indicator signal can be processed by the receiver processing portion 112*b* to produce output signals whereas processing of spurious signals by the receiver processing portion 112*b* can be impeded. Thus integrity of the system 100 can be preserved.

Additionally, it is further appreciable that an indicator signal is indicative of absence of a communication signal, in the communication medium 113, having a frequency component corresponding with a predetermined frequency. In this regard, if a source signal is associable with an indicator signal, probability of occurrence of destructive interference during communication of the source signal via the communication medium 113, or output signals being based on spurious signals, can be considered to be low. Hence encoding by the encoder portion 144 and recognition of the unique code at the receiver module 112 for the purposes of assuring integrity of the system 100 may not be necessary. In this regard, flexibility in configuring the system 100 for the purposes of assuring integrity thereof can be afforded.

Figure 2A:
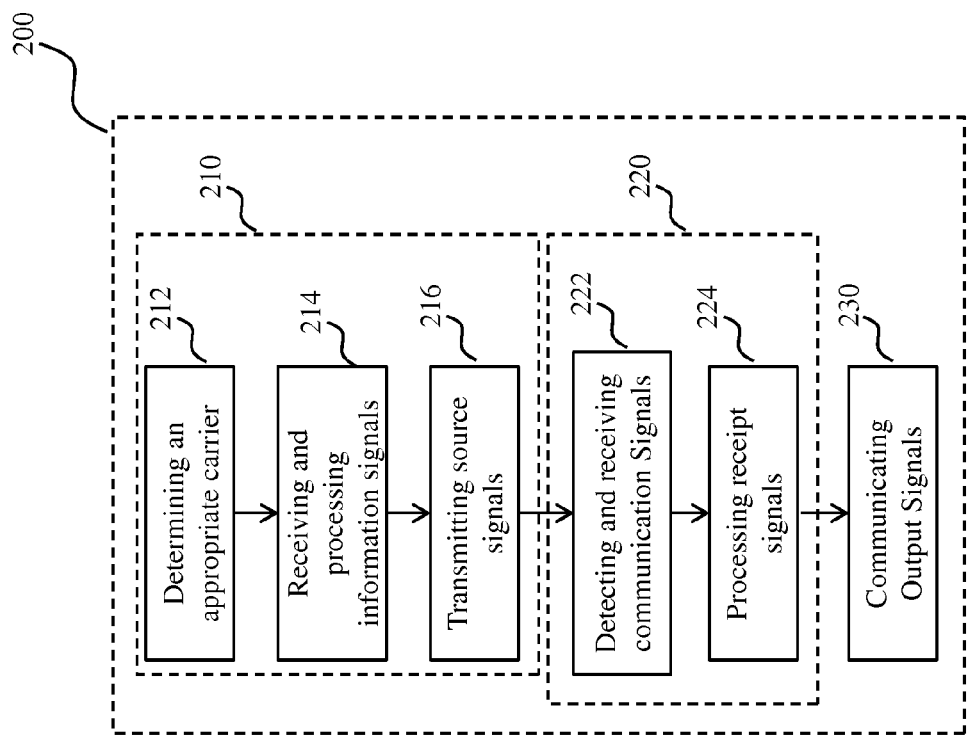
FIG. 2a shows a method in association with the system of FIG. 1a, the method includes a transmit part and a receive part.

Referring to FIG. 2a, a method 200 in association with the system 100 is illustrated. The method includes a transmission part 210 and a receive part 220.

The transmission part 210 includes determining an appropriate carrier signal 212 which will be discussed in further detail with reference to FIG. 2b. Additionally, the transmission part 210 includes receiving and processing information signals 214. Information signals can be received from the information source 100a and processed such that processed information signals are produced. Receiving and processing of information signals will be discussed in further detail with reference to FIG. 2c. The transmission part 210 can further include transmitting source signals 216. The processed information signals are processed by the source transmission portion 110c to produce source signals which are communicated from the transmitter module 110 to the receiver module 112.

The receive part 220 can include detecting and receiving communication signals 222. The source detection portion 112a can be configured to detect and receive communications signals, corresponding to the appropriate carrier frequency, from the communication medium 113. Based on the received communication signals, receipt signals are communicated from the source detection portion 112a. The receive part 220 can further include processing receipt signals 224. Receipt signals communicated from the source detection portion 112a can be received at the receiver processing portion 112b. The receiver processing portion 112b can process the receipt signals in a manner so as to identify source signals and produce output signals. Processing of receipt signals will be further discussed in further detail with reference to FIG. 2d.

Moreover, the method 200 can include communicating output signals 230. The output signals can be communicated from the receiver module 112 to the output module 100b. More specifically, output signals can be communicated from the receiver processing portion 112b to the output module 100b.

Figure 2B:
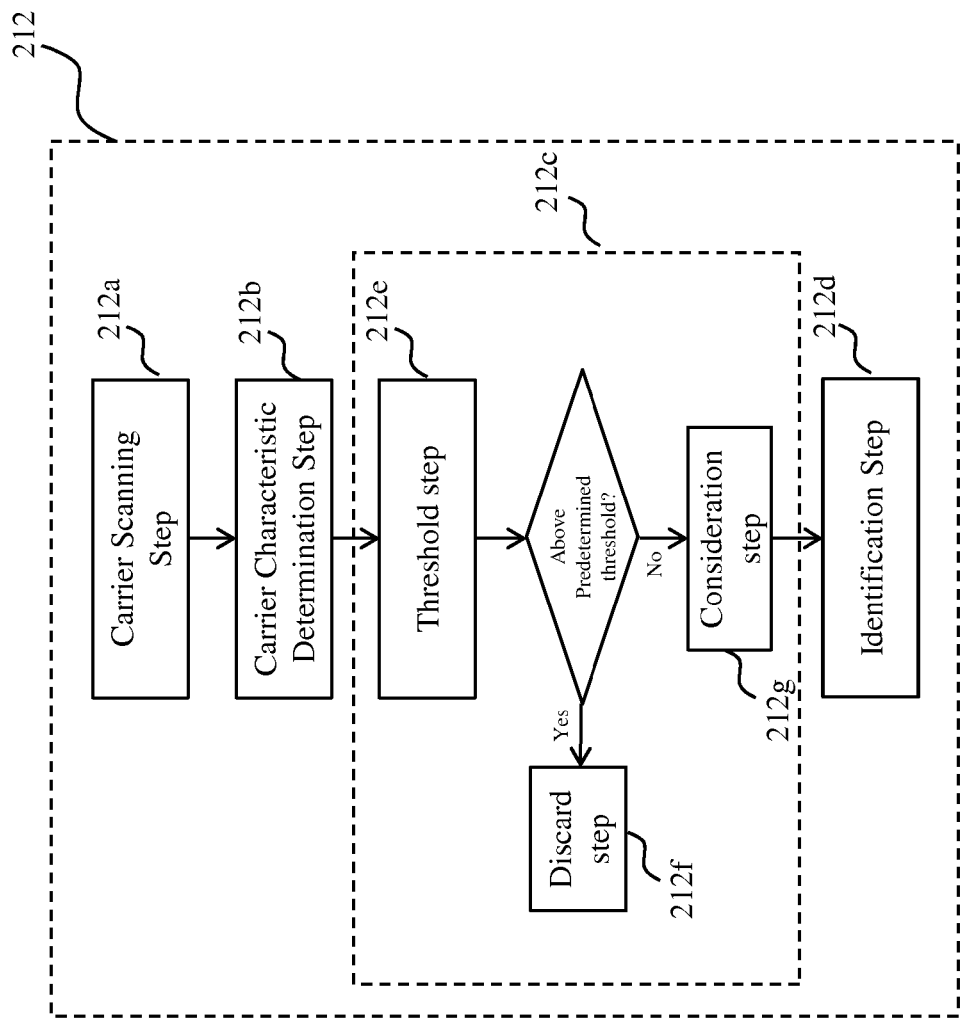

Referring to FIG. 2b, determining an appropriate carrier signal 212 includes a carrier scanning step 212a, a carrier characteristic determination step 212b, a comparison step 212c and an identification step 212d. The comparison step 212c includes a threshold step 212e, a discard step 212f and a consideration step 212g.

At the carrier scanning step 212a, the scanning tank circuit arrangement 114 of the carrier detection portion 110b can be configured to scan the communication medium 113. More particularly, the transmit parallel tank circuit 116 can be configured to scan the communication medium 113 to make a preliminary identification of signals having frequency components corresponding to any of the one or more predetermined frequency components. Based the preliminary identification of signals by the transmit parallel tank circuit 116, one or more preliminary identified signals can be determined.

At the carrier characteristic determination step 212b, one or both of the frequency component and the amplitude component associated with each of the preliminary identified signals can be determined, correspondingly, by the frequency detector 118 and the amplitude detector 120.

At the comparison step 212c, more particularly at the threshold step 212e, one or both of the amplitude component and frequency component of each preliminary identified signal can be compared with predetermined threshold values. The predetermined threshold values can be associated with one or both of the aforementioned frequency match based confirmation by the frequency detector 118 and aforementioned amplitude threshold based determination by the amplitude detector 120. Additionally, the predetermined threshold values can be implemented in the form of a lookup table which can be stored in, for example, one or all of the source processing portion 110a, the frequency detector 118 and the amplitude detector 120.

For example, the amplitude component of a preliminary identified signal can be compared with a predetermined amplitude threshold. Via comparison, if the amplitude component of the preliminary identified signal is above a predetermined amplitude threshold, the frequency component associated with the preliminary identified signal is identified as an unsuitable carrier frequency at the discard step 212f. Conversely, if the amplitude component of the preliminary identified signal is below a predetermined amplitude threshold, the frequency component associated with the preliminary identified signal is identified as a suitable carrier frequency and the method 200 proceeds to the consideration step 212g.

At the consideration step 212g, where a plurality of suitable carrier frequencies have been identified, a further comparison of the amplitude component associated with each of the plurality of suitable carrier frequencies can be made. A suitable carrier frequency associated with the lowest amplitude component with respect to amplitude components associated with the other suitable carrier frequencies can be identified. Thus one suitable carrier frequency associated with the lowest amplitude component can be selected out of the plurality of suitable carrier frequencies based on comparison of the amplitude components associated therewith. Therefore, an appropriate carrier signal can be based on the suitable carrier frequency identified with having the lowest amplitude component.

The aforementioned further comparison of the amplitude component can be made at one or both of the source processing portion 110a and the amplitude detector 120.

Furthermore, at the consideration step 212g, where only one suitable carrier frequency has been identified, an appropriate carrier signal can be based on the only identified carrier frequency. In one example, where the amplitude component of only one preliminary identified signal out of a plurality of preliminary identified signals is below the predetermined amplitude threshold, the only preliminary identified signal which amplitude component is below the predetermined amplitude threshold is identified as the only suitable carrier frequency which an appropriate carrier signal can be based on. In another example, where presence of communication signals, in the communication medium 113, having frequency components corresponding to the one or more predetermined frequency components are identified by the carrier detection portion 110b to be absent, a predetermined frequency component, which an appropriate carrier signal can be based on, can be identified therefrom.

At the identification step 212d, an appropriate carrier signal can be identified. The appropriate carrier signal can be identified based on the identification of a suitable carrier frequency at the consideration step 212g. The appropriate carrier signal can, for example, be identified at the source processing portion 110a.

In one exemplary implementation, with respect to determining an appropriate carrier signal 212, preliminary identification of a first to third communication signals, in the communication medium 113, having a first to third frequency components corresponding, respectively, to a first predetermined frequency component, a second predetermined frequency component and a third predetermined frequency component can be made. Thus a first preliminary identified signal, a second preliminary identified signal and a third preliminary identified signal corresponding, respectively, to the first to third predetermined frequency components can be determined.

In this regard, at the carrier scanning step 212a, the transmit switch array 133 of the transmit parallel tank circuit 116 can be controlled by the control signal in a manner such that each of the plurality of switches in the transmit switch array 133 switches between an open circuit position and closed circuit position in a sequential manner. More specifically, the first switch 133a, the second switch 133b and the third switch 133c can be switched between an open and closed circuit position in a sequential manner such that first, second and third predetermined frequency components can correspondingly be determined. In this manner, the transmit parallel tank circuit 116 can facilitate identification of presence or absence of communication signals having frequency components corresponding to any of the first, second or third predetermined components in the communication medium 113.

Apart from the above exemplary implementation, other implementations can include control of the transmit switch array 133 in a random manner or predetermined manner as discussed earlier.

Thus one or both of the frequency component and the amplitude component of each of the first to third preliminary identified signals can be determined at the carrier characteristic determination step 212b.

Thereafter, based on one or both of the frequency component and the amplitude component of each of the first to third preliminary identified signals, detection signals can be communicated to the source processing portion 110a and an appropriate carrier signal can be determined in the manner as described with reference to the comparison step 212c and the identification step 212d.

Figure 2C:
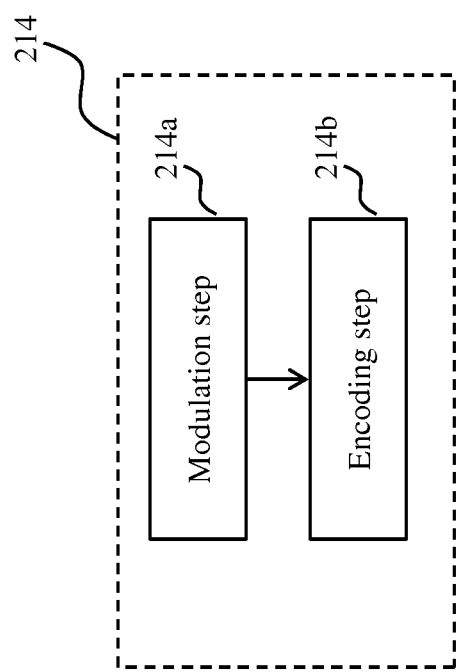

Referring to FIG. 2c, receiving and processing information signals 214 can include a modulation step 214a and, optionally, an encoding step 214b.

In one embodiment, at the modulation step 214a, an appropriate carrier signal can be modulated with an information signal by the modulation portion 142 to produce a modulated appropriate carrier signal. The modulated appropriate carrier signal corresponds to a processed information signal.

In another embodiment, as shown, at the modulation step 214a, an appropriate carrier signal can modulated with an information signal by the modulation portion 142 to produce a modulated appropriate carrier signal. The modulated appropriate carrier signal can be encoded with a unique code by the encoding portion 144 at the encoding step 214b to produce the first type encoded signal which corresponds to a processed information signal.

In yet another embodiment, at the encoding step 214b, an information signal can be encoded with a unique code by the encoding portion 144 to produce an encoded information signal. At the modulation step 214a, an appropriate carrier signal can be modulated with the encoded information signal by the modulation portion 142 to produce the second type encoded signal which corresponds to a processed information signal.

In yet a further embodiment, with respect to receiving and processing information signals 214, the source processing portion 110a can be configured to process information signals such that an indicator signal indicative of the negative frequency detection signal can be one of associated with the processed information signals and included with the processed information signals.

Figure 2D:
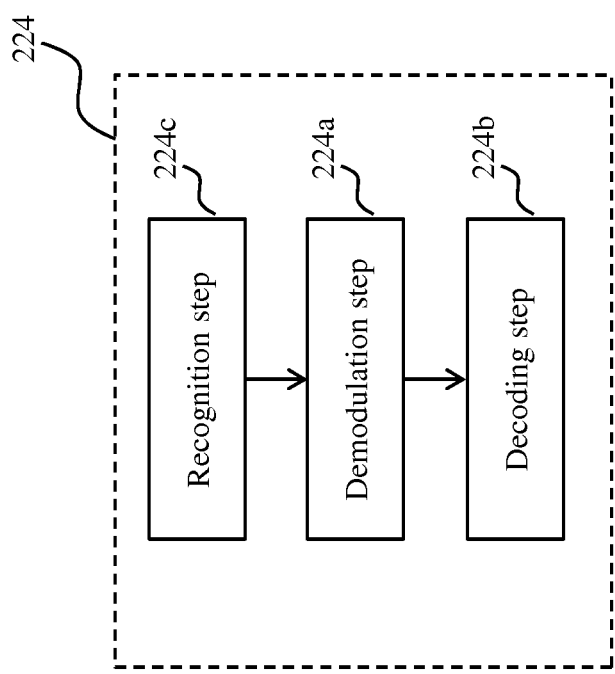

Referring to FIG. 2d, processing receipt signals 224 includes a demodulation step 224a and, optionally, a decoding step 224b. Processing receipt signals 224 can further include a recognition step 224c.

In one embodiment, at the demodulation step 224a, receipt signals communicated from the source detection portion 112a are preferably received and processed by the demodulation portion 150a to produce demodulated receipt signals. Alternatively, the demodulation portion 150a can be configured to recognize the indicator signal so as to positively identify the receipt signals as source signals. The demodulation portion 150a processes receipt signals positively identified as source signals by demodulating them. In this manner information signals can be extracted from the receipt signals to produce output signals.

In another embodiment, at the demodulation step 224a, receipt signals communicated from the source detection portion 112a are received and processed by the demodulation portion 150a to produce demodulated receipt signals. At the decoding step 224b, the decoding portion 150b can be configured to receive the demodulated receipt signals. The decoding portion 150b can be further configured to recognize one or both of the unique code and the indicator signal to positively identify the demodulated receipt signals as source signals. The decoding portion 150b further process the demodulated receipt signals identified as source signals by decoding them. In this manner information signals can be extracted from the receipt signals to produce output signals.

In yet another embodiment, at the decoding step 224b, receipt signals communicated from the source detection portion 112a are received by the decoding portion 150b. The decoding portion 150b can be configured to recognize one or both of the unique code and the indicator signal so as to positively identify the receipt signals as source signals. The decoding portion 150b processes the receipt signals positively identified as source signals by decoding them to produce decoded receipt signals. The demodulation portion 150a can be configured to receive and process the decoded receipt signals by demodulating them. In this manner information signals can be extracted from the receipt signals to produce output signals.

In yet a further embodiment, at the recognition step 224c, the recognition module (not shown) can be configured to recognize one or both of the unique code and the indicator signal. The recognition module can be coupled to one or both of the demodulation and decoding portions 150a/150b. The recognition module can be further coupled to the source detection portion 112a to receive receipt signals. Receipt signals positively identified as source signals by the recognition module can be further processed by the demodulation portion 150a and the decoding portion 150b by way of demodulation and decoding, respectively, as discussed earlier.

FIG. 2e shows the receive part 220 in further detail with respect to the earlier exemplary scenario discussed with reference to FIG. 2b, where preliminary identification of the first to third communication signals, in the communication medium 113, having a first to third frequency components corresponding, respectively, to a first predetermined frequency component, a second predetermined frequency component and a third predetermined frequency component is made by the carrier detection portion 110b. Thus, subject to the identification step 212d, a source signal having a frequency component corresponding to any one of the first to third predetermined frequency components can be communicated from the transmitter module 110 to the receiver module 112.

As shown, detecting and receiving communication signals 222 can include a first source signal scanning step 222a, a second source signal scanning step 222b and a third source signal scanning step 222c. The decoding step 224b includes a first matching step 224c, a second matching step 224d and a third matching step 224e.

With respect to detecting and receiving communication signals 222, the source detection portion 112a can be configured to detect communication signals having frequency components corresponding to any of the first to third predetermined frequency components. More specifically, the source detection portion 112a can be configured to detect communication signals corresponding to an appropriate carrier signal which can be, subject to the identification step 212d, based on any of the first to third predetermined frequency components. The receive switch array 126l can thus be controlled by the command signal from the receiver processing portion 112b in a manner analogous to control of the transmit switch array 133 by the control signal.

In one example, the fourth to sixth switches 126g/126i/126k can be controlled by the command signal to switch between an open circuit position and a closed circuit position in a sequential manner at the first to third source scanning steps 222a/222b/222c.

More specifically, at the first source signal scanning step 222a, the fourth switch 126g can be controlled by the command signal to switch between an open circuit position and a closed circuit position so as to detect a first communication signal having a frequency component corresponding to the first predetermined frequency component. Additionally, at the second source signal scanning step 222b the fifth switch 126i can be controlled by the command signal to switch between an open circuit position and a closed circuit position so as to detect a second communication signal having a frequency component corresponding to the second predetermined frequency component. Furthermore, at the third source signal scanning step 222c, the sixth switch 126k can be controlled by the command signal to switch between an open circuit position and a closed circuit position so as to detect a third communication signal having a frequency component corresponding to the third predetermined frequency component.

With respect to processing receipt signals 224, in one example, after the first communication signal has been communicated as a receipt signal from the source detection portion 112a to the receiver processing portion 112b, recognition of one or both of the unique code and the indicator signal is performed at the first matching step 224c. Where one or both the unique code and the indicator signal can be positively recognized, at the first matching step 224c, the receiver processing portion 112b recognizes the first communication signal as a source signal communicated from the transmitter module 110 and processes the receipt signal to produce an output signal which can be communicated to the output module 100b. Otherwise where, for example, the unique code is not positively recognized, a command signal can be communicated from the receiver processing portion 112b to switch the fifth switch 126i between an open circuit position and a closed circuit position at the second source scanning step 222b.

In another example, at the first matching step 224c, where the first communication signal is not detected, the unique code is not positively recognized. A command signal can be communicated from the receiver processing portion 112b to switch the fifth switch 126i between an open circuit position and a closed circuit position at the second detection step 222b.

The foregoing discussions pertaining to the first source scanning step 222a apply analogously to the second and third source scanning steps 222b/222c.

Furthermore, the foregoing discussions pertaining to the first communication signal with respect to the first matching step 224c analogously apply to the second communication signal with respect to the second matching step 224d and third communication signal with respect to the third matching step 224e.

Additionally, in the case of the third communication signal, if the third communication signal is not detected or, for example, the unique code is not recognized at the third matching step 224e, a command signal can be communicated from the receiver processing portion 112b to switch the fourth switch 126g between an open circuit position and a closed circuit position at the first source scanning step 222a.

Figure 3:
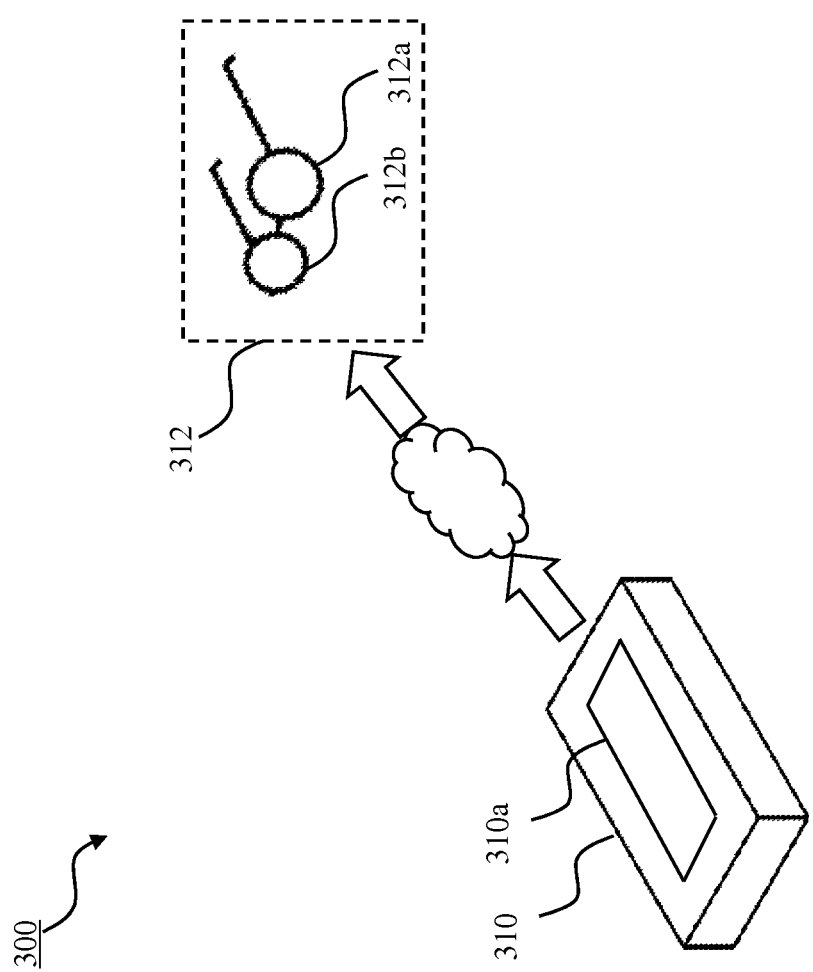
FIG. 3 shows an exemplary application of the system of FIG. 1.

FIG. 3 shows an exemplary application 300 of the system 100. As shown, the exemplary application 300 includes an electronic reader apparatus 310 configured to display digital content and a reading device 312 configured for use with the electronic reader apparatus 310. The electronic reader apparatus 310 and the reading device 312 correspond to the transmitter module 110 and the receiver module 112 respectively.

The electronic reader apparatus 310 is, for example, an electronic book (e-book) reader and the reading device 312 is, for example, a pair of liquid crystal shutter glasses having a left part 312a and a right part 312b.

The electronic reader apparatus 310 can include a display screen 310a via which the digital content is displayable and which is associable with a screen refresh rate. The electronic reader apparatus 310 can be configured, via a display technique such as alternate frame sequencing, to display digital content in a manner such that different viewing perspectives for each eye of a viewer of the digital content can be displayed. For example, display of the digital content can be associable with a left and right viewing perspective corresponding respectively to the left and right eye of the viewer.

Each of the left and right part 312a/312b includes a liquid crystal layer having variable states. Thus, each of the left and right part 312a/312b is associable with at least a first state and a second state. The first state can correspond to an opaque state and the second state can correspond to a transparent state.

The electronic reader apparatus 310 can be configured to communicate source signals, via the communication medium 113, to the reading device 312 to control each of the left and right part 312a/312b in a manner such that each can switch between the first state and the second state.

For example, source signals can be communicated from the electronic reader apparatus 310 to the reader device 312 to control each of the left and right part 312a/312b such that the left and right parts 312a/312b alternatively switch between an opaque state and a transparent state in synchronization with the screen refresh rate of the display screen 310a, the left viewing perspective of the displayed digital content and the right viewing perspective of the displayed digital content. When either the first part 312a or the second part 312b is in an opaque state, viewing of the displayed digital content through the reading device 312 can be impeded at the corresponding first part 312a or second part 312b which is in the opaque state. Conversely, when either the first part 312a or the second part 312b is in a transparent state, viewing of the displayed digital content through the reading device 312 can be allowed at the corresponding first part 312a or second part 312b which is in the transparent state.

More specifically, source signals can be communicated from the electronic reader apparatus 310 to the reading device 312 to control each of the left and right part 312a/312b such that the left part 312a is in a transparent state and the right part is in an opaque state when the left viewing perspective of the digital content is displayed. Conversely, when the right viewing perspective of the digital content is displayed, the left and right parts 312a/312b are controlled such that the left part 312a is in an opaque state and the right part is in a transparent state.

In this manner, the left eye and right eye of the viewer view only the left viewing perspective and right viewing perspective, respectively, of the displayed digital content. Thus a viewer, via the reading device 312, viewing the digital content displayed by the electronic reader apparatus 310, can be provided with an illusion of a three dimensional image corresponding to the displayed digital content.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

The invention claimed is:

1. A transmitter module for unidirectional communication with a receiver module, the transmitter module comprising:
    a carrier detection portion configured to
    (i) identify communication of a plurality of communication signals within a communication medium,
    (ii) determine signal strengths of the plurality of communication signals and defining each determined signal strength as one of substantial and negligible,
    (iii) identify frequency components of the communication signals having corresponding signal strengths defined as negligible as respective predetermined frequency components, at least one preliminary identified signal being produced based on the predetermined frequency components, and detection signals being communicable from the carrier detection portion based on the at least one preliminary identified signal;
    a source processing portion coupled to the carrier detection portion, the source processing portion configured to modulate an appropriate carrier signal with an information signal to produce a processed information signal, the appropriate carrier signal being based on the detection signals communicated from the carrier detection portion and the processed information signal is associable with at least one of a unique code and an indication signal, the indication signal being associable with absence of communication of the at least one communication signal in the communication medium; and
    a source transmission portion coupled to the source processing portion, the source transmission portion is configured to receive and process the processed information signal to produce a source signal, the source signal being associable with at least one of the unique code and the indication signal,
    wherein the source signal is communicable from the source transmission portion to the receiver module via the communication medium.

2. The transmitter module as in claim 1 wherein the source signal is communicable, from the transmitter module, as a communication signal corresponding to the appropriate carrier, and
    wherein the receiver module is configurable to detect and receive the communication signal corresponding to the appropriate carrier and identify the source signal based on at least one of the unique code and the indication signal.

3. The transmitter module as in claim 1 wherein the carrier detection portion comprises a scanning tank circuit arrangement for scanning the communication medium to identify the plurality of communication signals therewithin.

4. The transmitter module as in claim 3 wherein the scanning tank circuit arrangement comprises:
    a transmit parallel tank circuit for scanning the communication medium to identify presence or absence of the communication of the plurality of communications signals and communicate the at least one preliminary identified signal, each of the at least one preliminary identified signal having a frequency component and an amplitude component associable, respectively, with the at least one predetermined frequency component and signal strength of the preliminary identified signal;
    a frequency detector coupled to the transmit parallel tank circuit in a manner for receiving the at least one preliminary identified signal, the frequency detector for communicating one of a positive frequency detection signal, a null frequency detection signal and a negative frequency detection signal, based on frequency component of the at least one preliminary identified signal; and
    an amplitude detector coupled to the transmit parallel tank circuit for receiving the at least one preliminary identified signal, the amplitude detector for communicating one of a positive strength detection signal and a negative strength detection signal, based on amplitude component of the at least one preliminary identified signal.

5. The transmitter module as in claim 4 wherein when presence of communication of at least one communication signal is identified by the transmit parallel tank circuit, the frequency detector is configurable to make a confirmation of the frequency component of the at least one preliminary identified signal based on a frequency match based confirmation such that when the frequency component of the at least one preliminary identified signal substantially matches any one of the at least one predetermined frequency component, a positive frequency detection signal is communicated and a null frequency detection signal is communicated otherwise.

6. The transmitter module as in claim 4 wherein when absence of communication of at least one communication signal is identified by the transmit parallel tank circuit, the frequency detector is configurable to communicate a negative frequency detection signal.

7. The transmitter module as in claim 4 wherein when presence of communication of at least one communication signal is identified by the transmit parallel tank circuit, the amplitude detector is configurable to detect the amplitude component of the at least one preliminary identified signal and determine signal strength thereof based on an amplitude threshold based determination to which a predetermined amplitude threshold is associable, signal strength of the at least one preliminary identified signal being considered one of substantial and negligible when the amplitude component of the at least one preliminary identified signal is, respectively, one of above and below the predetermined amplitude threshold.

8. The transmitter module as in claim 7 wherein when signal strength of the at least one preliminary identified signal is considered substantial, the amplitude detector communicates the positive strength detection signal.

9. The transmitter module as in claim 7 wherein when signal strength of the at least one preliminary identified signal is considered negligible, the amplitude detector communicates the negative strength detection signal.

10. The transmitter module as in claim 7 wherein when absence of communication of at least one communication signal is identified by the transmit parallel tank circuit, the amplitude detector is configurable to communicate a negative strength detection signal.

11. The transmitter module as in claim 4, the appropriate carrier signal being based on the detection signals in a manner such that the detection signals are based on one of a negative frequency detection signal, a negative strength detection signal, a negative frequency detection signal in combination with a negative strength detection signal and a positive frequency detection signal in combination with a negative strength detection signal.

12. The transmitter module as in claim 3,
wherein a control signal is communicable from the source processing portion to the scanning tank circuit arrangement, and
wherein the scanning tank circuit arrangement comprises a transmit parallel tank circuit for scanning the communication medium in a manner so as to make the identification of one of presence and absence of communication of at least one communication signal having a frequency component corresponding to any one of a plurality of predetermined frequency components.

13. The transmitter module as in claim 12 wherein the transmit parallel tank circuit is controllable by the control signal in a manner such that number of the predetermined frequency components corresponding to the plurality of predetermined frequency components is variable.

14. The transmitter module as in claim 3,
wherein a control signal is communicable from the source processing portion to the scanning tank circuit arrangement, and
wherein the scanning tank circuit arrangement comprises a transmit parallel tank circuit for scanning the communication medium in one of a sequential manner, a random manner and predetermined manner.

15. A method for unidirectional communication from a transmitter module to a receiver module, the transmitter module comprising a source processing portion and a carrier detection portion coupled to the source processing portion, the method comprising:
identifying, by the carrier detection portion, communication of a plurality of communication signals within a communication medium;
determining signal strengths of the plurality of communication signals and defining each determined signal strength as one of substantial and negligible;
identifying frequency components of the communication signals having corresponding signals strengths defined as negligible as respective predetermined frequency components;
determining an appropriate carrier based on detection signals communicated from the carrier detection portion, the detection signals being based on at least one preliminary identified signal which is based on the predetermined frequency components;
modulating an appropriate carrier signal with an information signal to produce a processed information signal; the processed information signal is associable with at least one of a unique code and an indication signal, the indication signal being associable with absence of communication of the at least one communication signal in the communication medium;
transmitting a source signal, the processed information signal being further processed to produce the source signal, the source signal being associable with at least one of the unique code and the indication signal,
wherein the source signal is communicable to the receiver module via the communication medium.

16. The communication method as in claim 15 wherein the source signal is communicable as a communication signal corresponding to the appropriate carrier, and
wherein the communication method further comprises detecting and receiving the communication signal corresponding to the appropriate carrier, and communicating a receipt signal based on the received communication signal.

17. The communication method as in claim 16 further comprising processing the receipt signal in a manner so as to one of positively and negatively identify the source signal, positive and negative identification of the source signal being based on at least one of the unique code and the indication signal.

18. The communication method as in claim 17 wherein when the source signal is positively identified, the receipt signals is processed to produce an output signal.

19. The communication method as in claim 17 wherein when the source signal is negatively identified, the receipt signal is identified as a spurious signal.

20. The communication method as in claim 19 wherein when the receipt signal is identified as a spurious signal, processing of the receipt signal to produce an output signal is impeded.

* * * * *